United States Patent
Hiramoto et al.

(10) Patent No.: US 12,554,818 B2
(45) Date of Patent: Feb. 17, 2026

(54) SYSTEM, SERVER APPARATUS, AUTHENTICATION METHOD, AND STORAGE MEDIUM

(71) Applicant: NEC Corporation, Tokyo (JP)

(72) Inventors: Noriyuki Hiramoto, Tokyo (JP); Taichi Okumura, Tokyo (JP); Tatsuki Akutsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 129 days.

(21) Appl. No.: 18/564,124

(22) PCT Filed: May 31, 2021

(86) PCT No.: PCT/JP2021/020611
§ 371 (c)(1),
(2) Date: Nov. 27, 2023

(87) PCT Pub. No.: WO2022/254484
PCT Pub. Date: Dec. 8, 2022

(65) Prior Publication Data
US 2024/0256644 A1    Aug. 1, 2024

(51) Int. Cl.
*G06F 21/32* (2013.01)
(52) U.S. Cl.
CPC .................... *G06F 21/32* (2013.01)
(58) Field of Classification Search
CPC ....................................................... G06F 21/32
(Continued)

(56) References Cited

U.S. PATENT DOCUMENTS

| 2019/0295344 | A1 | 9/2019 | Bodell et al. |
| 2021/0334346 | A1* | 10/2021 | Sim .................... G06F 21/32 |
| 2021/0334481 | A1* | 10/2021 | Giobbi ............... G06K 19/0718 |

FOREIGN PATENT DOCUMENTS

| JP | 2002-258974 A | 9/2002 |
| JP | 2006-221515 A | 8/2006 |

(Continued)

OTHER PUBLICATIONS

JP Office Action for JP Application No. 2023-173674, mailed on Jan. 7, 2025 with English Translation.

(Continued)

*Primary Examiner* — Kambiz Zand
*Assistant Examiner* — Lawrence Q Truong
(74) *Attorney, Agent, or Firm* — Sughrue Mion, PLLC

(57) ABSTRACT

A system includes a server apparatus and at least one or more authentication terminals. The server apparatus stores an ID of each of a plurality of users and biometric information in association with each other. The at least one or more authentication terminals maintain an ID list that stores IDs of at least one or more persons staying in a predetermined area. The at least one or more authentication terminals transmit an authentication request, the authentication request including biometric information of a person to be authenticated and the ID list, to the server apparatus when an authentication of the person to be authenticated is required. The server apparatus extracts IDs included in the ID list from the ID of each of the plurality of users and performs biometric authentication using biometric information corresponding to the extracted IDs and the biometric information included in the authentication request.

7 Claims, 34 Drawing Sheets

(58) Field of Classification Search
USPC .......................................................... 713/186
See application file for complete search history.

(56) References Cited

FOREIGN PATENT DOCUMENTS

| JP | 2007-299214 A | | 11/2007 | | |
|----|---------------|---|---------|---|---|
| JP | 2008-071366 A | | 3/2008 | | |
| JP | 2008287658 A | * | 11/2008 | | |
| JP | 2009-100334 A | | 5/2009 | | |
| JP | 2009-230267 A | | 10/2009 | | |
| JP | 2012-027657 A | | 2/2012 | | |
| JP | 2016157294 A | * | 9/2016 | ......... | G06F 17/5045 |
| JP | 2019032803 A | * | 2/2019 | | |
| JP | 2019-067075 A | | 4/2019 | | |
| JP | 2019-164646 A | | 9/2019 | | |
| WO | 2018/110012 A1 | | 6/2018 | | |
| WO | 2019/181364 A1 | | 9/2019 | | |
| WO | 2021/060670 A1 | | 4/2021 | | |
| WO | WO-2022168225 A1 | * | 8/2022 | ......... | G06Q 30/0225 |

OTHER PUBLICATIONS

JP Office Action for JP Application No. 2023-173674, mailed on Nov. 19, 2024 with English Translation.
International Search Report for PCT Application No. PCT/JP2021/020611, mailed on Aug. 24, 2021.
Written opinion for PCT Application No. PCT/JP2021/020611, manned on Aug. 24, 2021.
Japanese Office Communication for JP Application No. 2022-501274, maiied on Feb. 1, 2023 with English Translation.
Japanese Office Action for JP Application No. 2022-021876, maiied on May 9, 2023 with English Translation.
Japanese Office Communication for JP Application No. 2022-021876, mailed on Jun. 29, 2023 with Engiish Translation.
Japanese Office Action for JP Application No. 2022-115243, mailed on Jul. 18, 2023 with English Translation.
Japanese Office Communication for JP Application No. 2022-115243, mailed on Sep. 5, 2023 with English Translation.

* cited by examiner

FIG.7

MEMBER INFORMATION DATABASE

| MEMBERSHIP ID | BIOMETRIC INFORMATION (FEATURE VALUE) | ACCOUNT INFORMATION | PERSONAL INFORMATION | | |
|---|---|---|---|---|---|
| | | | NAME | AGE | GENDER | ... |
| ID01 | FV01 | AC01 | NM11 | 51 | FEMALE | ... |
| ID02 | FV02 | AC02 | NM12 | 52 | MALE | ... |
| ... | ... | ... | ... | ... | ... | ... |

ENTRANT LIST

| DATE AND TIME OF ENTRY | MEMBERSHIP ID |
|---|---|
| Y1/M1/D1 H1:M1:S1 | ID11 |
| Y1/M1/D1 H1:M1:S2 | ID12 |
| Y1/M1/D1 H2:M2:S2 | ID13 |
| Y1/M1/D1 H2:M2:S3 | ID14 |
| ... | ... |

FIG.11

ENTRANT LIST

| DATE AND TIME OF ENTRY | MEMBERSHIP ID | BIOMETRIC INFORMATION |
|---|---|---|
| Y2/M1/D1 H1:M1:S1 | ID21 | FV21 |
| Y2/M1/D1 H1:M1:S2 | ID22 | FV22 |
| Y2/M1/D1 H2:M2:S2 | ID23 | FV23 |
| Y2/M1/D1 H2:M2:S3 | ID24 | FV24 |
| ... | ... | ... |

FIG.17

| DATE | OPPORTUNITY LOSS RATE |
|---|---|
| Y2/M2/D1 | L1 % |
| Y2/M2/D2 | L2 % |
| Y2/M2/D3 | L3 % |
| Y2/M2/D4 | L4 % |
| ... | ... |

FIG.28

| DATE | OPPORTUNITY LOSS RATE | | |
|---|---|---|---|
| | 10S | 20S | ... |
| Y2/M2/D1 | L11 % | L12 % | ... |
| Y2/M2/D2 | L21 % | L22 % | ... |
| Y2/M2/D3 | L31 % | L32 % | ... |
| Y2/M2/D4 | L41 % | L42 % | ... |
| ... | ... | ... | ... |

FIG.29

ENTRANT LIST

| DATE AND TIME OF ENTRY | MEMBERSHIP ID | BIOMETRIC INFORMATION | FLOW LINE |
|---|---|---|---|
| Y2/M1/D1 H1:M1:S1 | ID21 | FV21 | 30-1:30-2:30-3 |
| Y2/M1/D1 H1:M1:S2 | ID22 | FV22 | 30-1:30-2:30-5:30-6 |
| Y2/M1/D1 H2:M2:S2 | ID23 | FV23 | 30-1:30-2:30-5:30-6 |
| Y2/M1/D1 H2:M2:S3 | ID24 | FV24 | 30-6:30-5:30-2:30-1 |
| ... | ... | ... | ... |

FIG.30

| FLOW LINE ID | NUMBER OF FLOW LINES | |  |
|---|---|---|---|
| | 10S | 20S | |
| FLOW LINE 1 | 10 | 30 | ... |
| FLOW LINE 2 | 30 | 50 | ... |
| FLOW LINE 3 | 33 | 40 | ... |
| FLOW LINE 4 | 40 | 42 | ... |
| ... | ... | ... | ... |

FIG.32

| FLOW LINE ID | OPPORTUNITY LOSS RATE |
|---|---|
| FLOW LINE 1 | L5 % |
| FLOW LINE 2 | L6 % |
| FLOW LINE 3 | L7 % |
| FLOW LINE 4 | L8 % |
| ... | ... |

FIG.33

SYSTEM, SERVER APPARATUS, AUTHENTICATION METHOD, AND STORAGE MEDIUM

This application is a National Stage Entry of PCT/JP2021/020611 filed on May 31, 2021, the contents of all of which are incorporated herein by reference, in their entirety.

TECHNICAL FIELD

The present invention relates to a system, a server apparatus, an authentication method, and a storage medium.

BACKGROUND ART

In recent years, services using biometric authentication have begun to spread.

For example, PTL 1 describes that an accuracy of identifying an identification information of a visitor to a store for use in predetermined processing in store (payment processing for product purchases, and so on) can be improved. A store management apparatus described in PTL 1 communicates with a terminal device carried by a visitor to the store when the visitor's identity is checked through face authentication. The store management device selects a registered customer corresponding to the visitor from among a plurality of registered customers, and performs authentication using a group of registered customers' biometric information corresponding to the visitor and the visitor's biometric information newly acquired at a timing of execution of the predetermined process in the store. The store management apparatus identifies the visitor as a target of the predetermined process (for example, payment processing for product purchases) by the authentication.

PTL 2 describes both security and convenience of electronic payments for purchase of goods and services. A biometric authentication apparatus described in PTL 2 acquires a CID that identifies a user and a face image. The biometric authentication apparatus downloads a set of face images of persons in a store in advance and authenticates the user by matching these face images with the acquired face image. When the authentication is successful, the biometric authentication apparatus requests a payment apparatus to settle the price of product to be purchased by the user, and when the payment is authorized by the payment apparatus, the purchase of the product is permitted.

CITATION LIST

Patent Literature

[PTL 1] International Publication WO2019/181364
[PTL 2] Japanese Unexamined Patent Application Publication No. 2019-067075

SUMMARY OF INVENTION

Technical Problem

As mentioned above, various kinds of services using biometric authentication has started to be provided. In such a system using biometric authentication, a terminal for biometric authentication is installed in a retail store, and so on, and biometric information is transmitted from the terminal to a server. The server performs matching processing using the acquired biometric information and biometric information stored in a database to identify the user.

Here, as the scale of services using biometric authentication grows, a large number of similar biometric information (for example, face images or feature values generated from face images) will be registered in the database. As the number of biometric information (in other words, biometric information to be matched) in the database increases, an accuracy of authentication decreases.

It is a main object of the present invention to provide a system, a server apparatus, an authentication method, and a storage medium that contribute to improving an accuracy of biometric authentication.

Solution to Problem

According to a first aspect of the present invention, there is provided a system, including: a server apparatus that stores an ID of each of a plurality of users and biometric information in association with each other; and at least one or more authentication terminals, wherein the at least one or more authentication terminals maintain an ID list that stores IDs of at least one or more persons staying in a predetermined area and transmit an authentication request, the authentication request including biometric information of a person to be authenticated and the ID list, to the server apparatus when an authentication of the person to be authenticated is required, and the server apparatus extracts IDs included in the ID list from the ID of each of the plurality of users and performs biometric authentication using biometric information corresponding to the extracted IDs and the biometric information included in the authentication request.

According to a second aspect of the present invention, there is provided a system, including: a first server apparatus that stores an ID of each of a plurality of users and biometric information in association with each other; a device that notifies an ID of a person staying in a predetermined area to the first server apparatus, and at least one or more authentication terminals, wherein the first server apparatus notifies biometric information corresponding to the notified ID among the IDs of the plurality of users to the at least one or more authentication terminals, and wherein the at least one or more authentication terminals stores the notified biometric information in a biometric information list and performs biometric authentication using the biometric information of a person to be authenticated and biometric information stored in the biometric information list when an authentication of the person to be authenticated becomes necessary.

According to a third aspect of the present invention, there is provided a server apparatus including: a storage unit that stores an ID of each of a plurality of users and biometric information in association with each other; a receiving unit that receives an authentication request, the authentication request including biometric information of a person to be authenticated and an ID list, from an authentication terminal that maintains the ID list that stores IDs of at least one or more persons staying in a predetermined area; and an authentication unit that extracts IDs included in the ID list from the ID of each of the plurality of users and performs biometric authentication using biometric information corresponding to the extracted IDs and the biometric information included in the authentication request.

According to a fourth aspect of the present invention, there is provided an authentication method performed in a server apparatus that stores an ID of each of a plurality of users and biometric information in association with each other, the authentication method including: receiving an authentication request, the authentication request including biometric information of a person to be authenticated and an ID list, from an authentication terminal that maintains the ID list that stores IDs of at least one or more persons staying in a predetermined area; extracting IDs included in the ID list from the ID of each of the plurality of users; and performing biometric authentication using biometric information corresponding to the extracted IDs and the biometric information included in the authentication request.

According to a fifth aspect of the present invention, there is provided a computer-readable storage medium storing a program that causes a computer mounted on a server apparatus that stores an ID of each of a plurality of users and biometric information in association with each other, to perform processing for: receiving an authentication request, the authentication request including biometric information of a person to be authenticated and an ID list, from an authentication terminal that maintains the ID list that stores IDs of at least one or more persons staying in a predetermined area; extracting IDs included in the ID list from the ID of each of the plurality of users; and performing biometric authentication using biometric information corresponding to the extracted IDs and the biometric information included in the authentication request.

Advantageous Effects of Invention

The individual aspects of the present invention provide a system, a server apparatus, an authentication method, and a storage medium that contribute to improving an accuracy of biometric authentication. The advantageous effect of the present invention is not limited to the above advantageous effect. The present invention may provide other advantageous effects, instead of or in addition to the above advantageous effect.

BRIEF DESCRIPTION OF THE DRAWINGS

FIG. 7 is a diagram illustrating an example of a membership information database according to the first example embodiment.

FIG. 11 is a diagram illustrating an example of an entrant list according to the first example embodiment.

FIG. 17 is a diagram illustrating an example of an entrant list according to the second example embodiment.

FIG. 28 is a diagram illustrating an operation of an analysis unit of a variation according to the present application.

FIG. 29 is a diagram illustrating an operation of the analysis unit of the variation according to the present application.

FIG. 30 is a diagram illustrating an example of an entrant list of a variation according to the present application.

FIG. 32 is a diagram illustrating an operation of a flow line information providing unit of a variation according to the present application.

FIG. 33 is a diagram illustrating an operation of the flow line information providing unit of the variation according to the present application.

EXAMPLE EMBODIMENT

Figure 1:
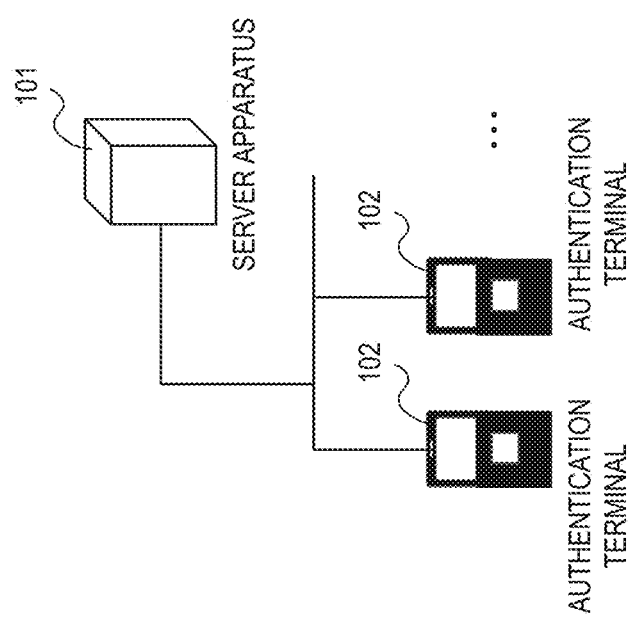
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

A system according to an example embodiment includes a server apparatus 101 and at least one or more authentication terminals 102 (see FIG. 1). The authentication server 101 stores an ID of each of a plurality of users and biometric information in association with each other. The at least one or more authentication terminals 102 maintain an ID list that stores IDs of at least one or more persons staying in a predetermined area. When an authentication of a person to be authenticated is required, the at least one or more authentication terminals 102 transmit an authentication request, the authentication request including biometric information of the person to be authenticated and the ID list, to the server apparatus 101. The server apparatus 101 extracts IDs included in the ID list from the IDs of each of the plurality of users, and performs biometric authentication using biometric information corresponding to the extracted IDs and the biometric information included in the authentication request.

As described above, when the number of biometric information on the registration side increases due to the biometric authentication, an accuracy of authentication deteriorates. In particular, when the number of registered users reaches tens of millions, there is a possibility that a false authentication (false rejection, false acceptance) may occur. In addition, when the number of users becomes large, there is a concern that resources on the authentication center side will be insufficient, and an increase, and so on in the number of servers will be necessary. Alternatively, if servers, and so on are not augmented, it may take a long time to acquire the results of biometric authentication.

To deal with such problems, the system according to the example embodiment accumulates an ID assigned to a user (a user who will become a person to be authenticated in the future; a potential authenticated person) staying in a predetermined area (for example, in a store) inside the authentication terminal 102. The authentication terminal 102 acquires biometric information of a user who requires biometric authentication among users staying in the predetermined area, and also transmits the biometric information and an ID accumulated internally (a list that includes at least one or more IDs) to the server apparatus 101. The server apparatus 101 extracts IDs described in the ID list from among the IDs of users registered in advance. In other words, the server apparatus 101 extracts the IDs of the users staying in the predetermined area from among users registered in advance. The server apparatus 101 sets biometric information corresponding to the extracted IDs as biometric information on the registration side and biometric information included in the authentication request as biometric information on the matching side, and performs biometric authentication (matching processing).

With the system configuration and operation as described above, the number of biometric authentications on the registration side in biometric authentication is reduced, and an occurrence of a false authentications can be prevented. In other words, the number of users entering (staying at) the store during the same time period (the number of persons entering the store) is significantly smaller than the number of users registered in advance (the number of members), and N in the 1-to-N matching (N is a positive integer, and the same applies to the following description) becomes smaller. As a result, the occurrence of the false identification is prevented. In addition, since the number N of biometric information on the registration side is reduced, resource requests to the authentication center do not increase, and the cost required for biometric authentication can be reduced. In addition, by reducing the above N, the time required to acquire the result of biometric authentication does not become longer (the throughput of the system does not decrease).

In addition, the authentication terminal 102 transmits an authentication request that includes the ID list of users staying in the predetermined area (in the store) to the server apparatus 101 at the timing when biometric authentication of the user is required. This operation of the authentication terminal 102 prevents the server apparatus 101 from performing unnecessary processing (the resources of the server apparatus 101 are no longer wasted). Here, not all users who enter a store may necessarily engage in some consumption behavior (behavior that requires biometric authentication). Processing regarding users who do not engage in such consumption behavior is unnecessary. In the system according to the example embodiment, even when a user enters the predetermined area, an ID is only acquired from the terminal of the person entering the area, thereby the authentication center (the server apparatus 101) does not perform any operation. In this system, a biometric authentication is requested to the authentication center (the server apparatus 101) at the timing when an authentication of a person staying is required. As a result, unnecessary operations by the server apparatus 101 are suppressed and the resources of the server apparatus 101 are not wasted nor the processing speed is reduced.

Hereinafter, specific example embodiments will be described in more detail with reference to drawings.

First Example Embodiment

A first example embodiment will be described in more detail with reference to drawings.
[System Configuration]

Figure 2:
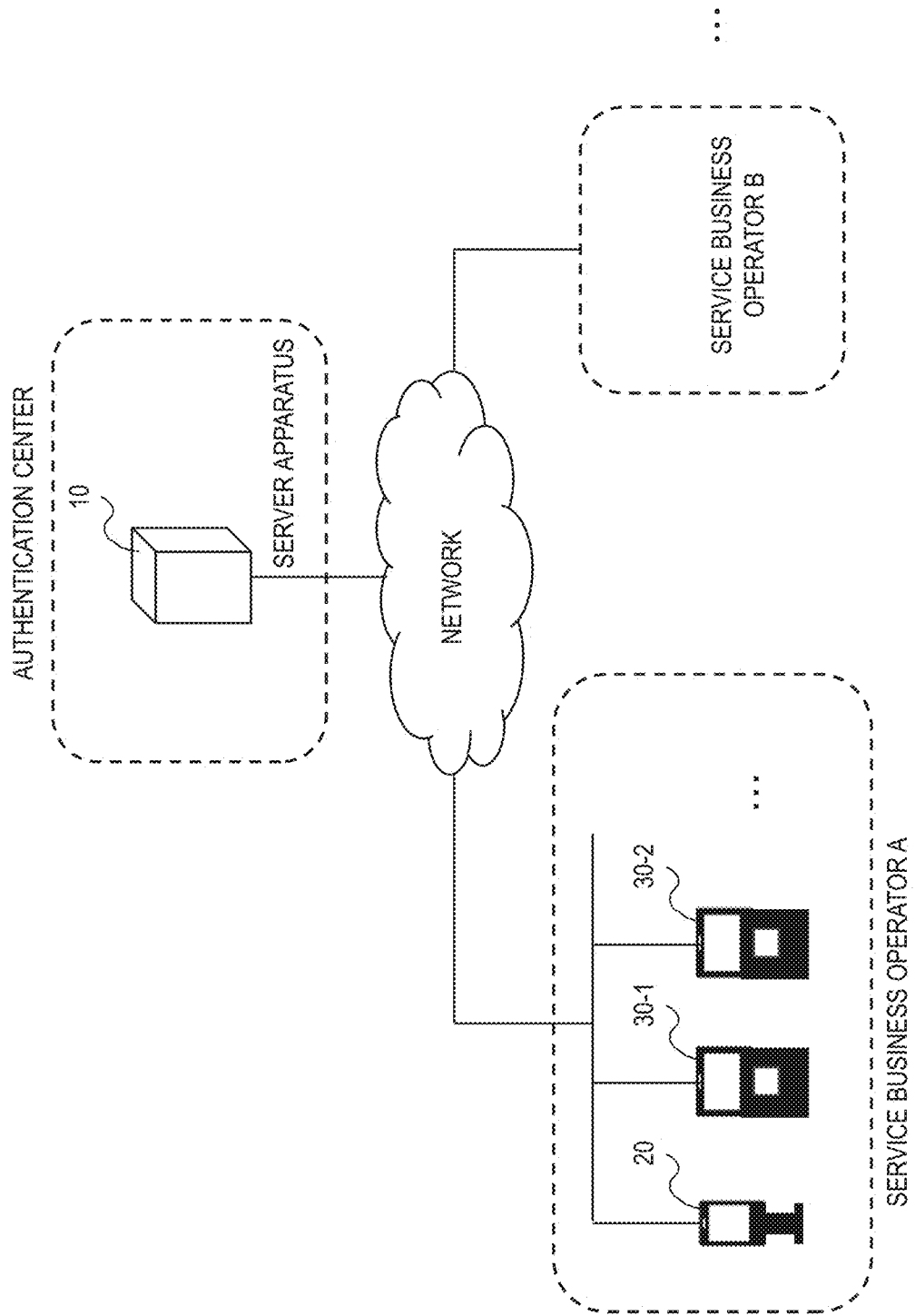
FIG. 2 is a diagram illustrating an example of a schematic configuration of an authentication system according to a first example embodiment.

FIG. 2 is a diagram illustrating an example of a schematic configuration of an authentication system according to the first example embodiment. As illustrated in FIG. 2, the authentication system includes an authentication center and service business operators.

The authentication center provides biometric authentication services to service business operators. A server apparatus 10 is included in the authentication center. The server apparatus 10 is a server that performs biometric authentication. The server apparatus 10 performs primary functions of the authentication center. The server apparatus 10 stores at least an ID of each of a plurality of users and biometric information in association with each other.

The service business operators provide services to users using a biometric authentication. Example of the services provided by the service business operators includes payment services at retail stores, and so on. Alternatively, biometric authentication may be used for payment at video rental stores. In the first example embodiment, the service business operator is described as a business operating a video rental store.

As shown in FIG. 2, the service business operator includes a signage 20 and a plurality of authentication terminals 30-1 and 30-2. In the following description, unless there is a particular reason to distinguish the plurality of authentication terminals 30-1, 30-2 from each other, any one of authentication terminals 30-1 and 30-2 will simply be referred to as "authentication terminal 30".

As shown in FIG. 2, the terminals (the signage 20 and the authentication terminals 30) installed in the service business operator are configured to be able to communicate with each other, and each terminal is configured to be able to communicate with the server apparatus 10. For example, the service server 10 and the authentication terminals 30 are connected by wired or wireless communication means.

The configuration illustrated in FIG. 2 is an example and does not limit the configuration or the like of the authentication system disclosed in the present application. For example, two or more server apparatuses 10 may be included in the authentication center. Further, the service business operator may include at least one authentication terminal 30.

Figure 3:
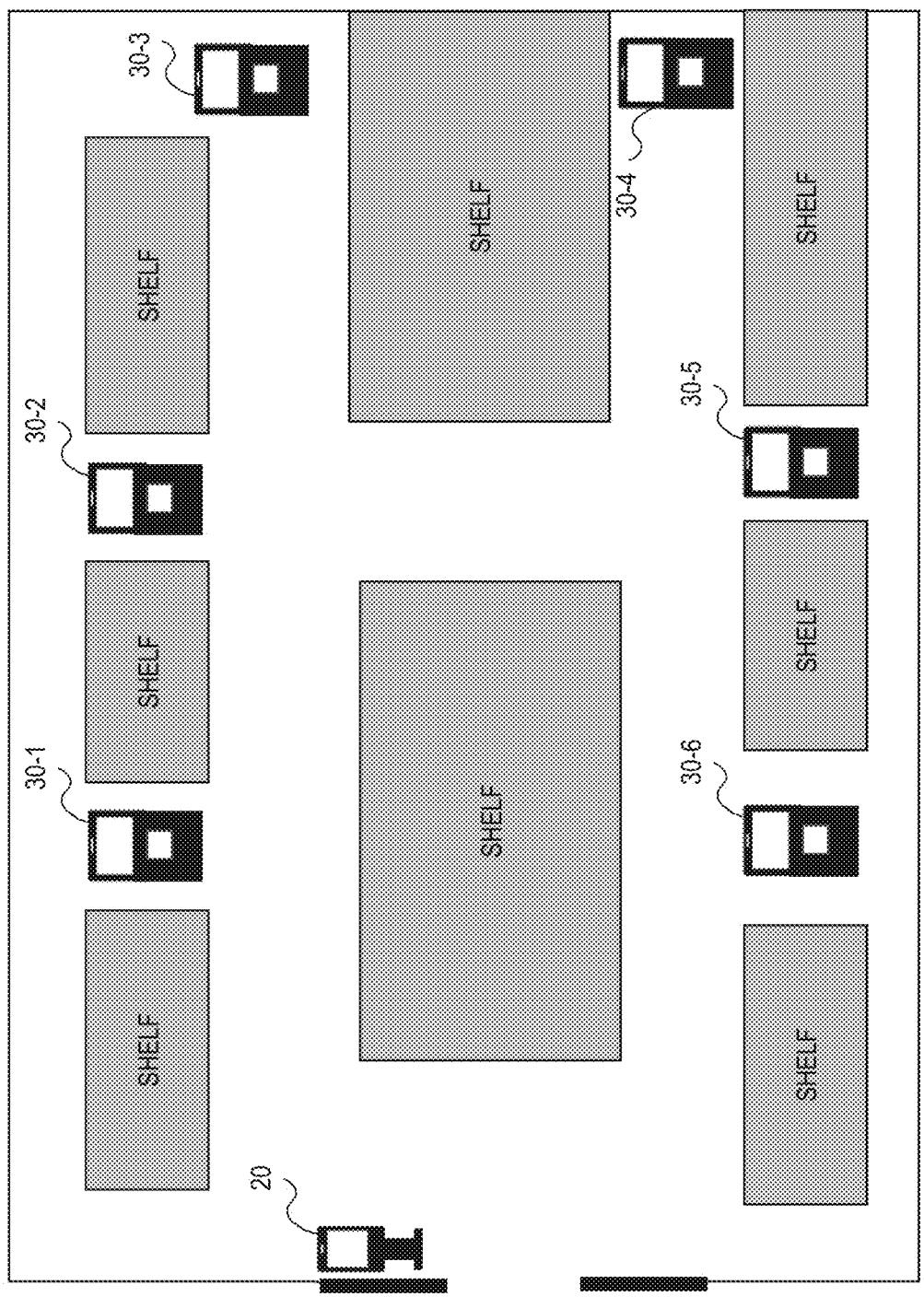
FIG. 3 is a diagram illustrating an arrangement of a signage and authentication terminals according to the first example embodiment.

The signage 20 is an apparatus (device) installed near an entrance and exit of a store (rental video store), as shown in FIG. 3. The signage 20 displays messages that welcome customers to the store or displays messages such as event information.

The authentication terminals 30 are installed at various locations in the store. For example, the authentication terminals 30 are installed between product display shelves. A user settles a payment using the authentication terminal 30. The payment is made mainly through a biometric authentication (facial authentication). The authentication terminals 30 operate as a so-called self-register.

For example, the biometric information about a user is data (feature values) calculated from physical features unique to this individual user. The physical features are about the face, a fingerprint, a voiceprint, a vein, a retina, or an iris pattern of an eye of the user. Alternatively, the biometric information of a user may be image data of a face image or a fingerprint image of the user, for example. The biometric information of a user may be any information including physical features of the user. In the first example embodiment, the biometric information is a human face image or feature values generated from the face image.

[Outline of Operation]

Next, outline of operations in the authentication system according to the first example embodiment will be described.

<User Registration>

Users who use a store (video rental store) are required to register in advance (membership registration or user registration).

Figure 4:
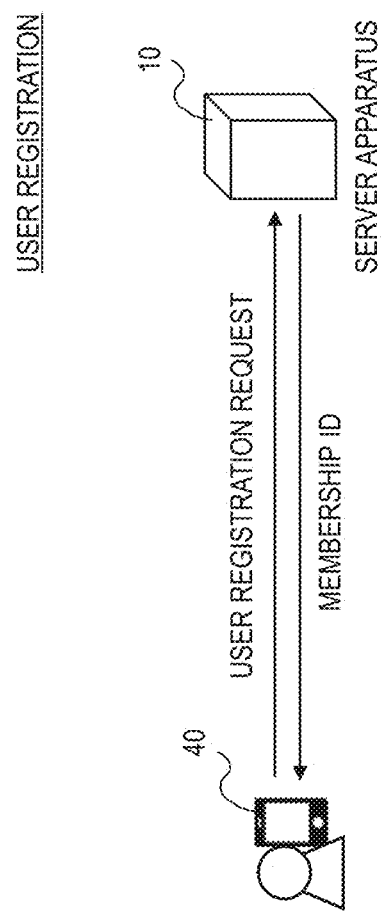
FIG. 4 is a diagram illustrating an operation of the authentication system according to the first example embodiment.

A user accesses the server apparatus 10 by operating a terminal 40 in his or her possession. The user inputs his or her biometric information (for example, face image), personal information (for example, name, age, gender, address, and so on), and account information for payment (for example, bank account, credit card information, and so on) to the server apparatus 10 (see FIG. 4).

The terminal 40 transmits to the server apparatus 10 a "user registration request" including the biometric information, the personal information, and the account information, and so on.

Upon acquiring the biometric information, and so on, the server apparatus 10 generates a membership ID (IDentifier) to identify a user (member). The server apparatus 10 stores the generated membership ID, the acquired biometric information, the acquired personal information, and the acquired account information, in a membership information database in correspondence each other.

In addition, the server apparatus 10 issues the generated membership ID to the user. Specifically, the server apparatus 10 transmits a response (a response to the user registration request) that includes the membership ID to the terminal 40.

The terminal 40 stores the received membership ID.

<Store Visit>

A user (member) visits a store with the terminal 40 in his or her possession. The signage 20 installed at an entrance and exit of the store communicates with the terminal 40. For example, the terminal 40 and the signage 20 communicate with each other via wireless communication (in particular, short-range wireless communication) such as ZigBee (registered trademark) and Bluetooth (registered trademark) (see FIG. 5).

The signage 20 transmits a "membership ID transmission request" periodically or at predetermined timing. When the user (the terminal 40) reaches a predetermined range centered on the signage 20, the terminal 40 receives the membership ID transmission request.

In response to the request, the terminal 40 transmits the membership ID issued by the server apparatus 10 to the signage 20.

When the signage 20 acquires the membership ID from the terminal 40, the signage 20 transmits a "member entry notification" including the acquired membership ID to each of the authentication terminals 30 in the store. Note that in FIG. 5, the member entry notification is described as being transmitted to the authentication terminals 30-1 to 30-3, but in reality, the notification is also transmitted to the authentication terminals 30-4 to 30-6.

Each authentication terminal 30 retrieves the membership ID included in the member entry notification. Each authentication terminal 30 adds the retrieved membership ID to an "entrant list". The entrant list is a list (ID list) consisting of the membership IDs of users (members) staying in the store. For example, if three users enter the store, three membership IDs will be listed on the entrant list.

A user moves through the store and selects a product that the user wishes to rent. The user moves in front of the authentication terminal 30 with the selected product in his or her hand. The authentication terminal 30 to which the user is headed can be any of the authentication terminals 30-1 to 30-6. In the example in FIG. 5, the user is moving in front of the authentication terminal 30-3 with the product.

When the authentication terminal 30 detects a user (person), the authentication terminal 30 executes a process related to a payment for the product. The authentication terminal 30 acquires biometric information (face image) of the user standing in front of the authentication terminal 30. The authentication unit 30 generates a feature value from the acquired face image.

The authentication terminal 30 transmits an "authentication request" including the generated feature value (biometric information) and the entrant list to the server apparatus 10.

Upon receiving the authentication request, the server apparatus 10 performs biometric authentication.

At first, the server apparatus 10 searches the membership information database using the membership ID described in the entrant list as a key. As a result of the search, entries of the users who are entering the store are extracted. For example, when thirty thousands members made user registration and three members are staying in the store, three entries are extracted from the membership IDs corresponding to the three members.

Next, the server apparatus 10 performs biometric authentication (matching processing) using the biometric information included in the authentication request and the biometric information included in the above extracted entries. More specifically, the server apparatus 10 performs one-to-N matching.

When the biometric authentication is successful, the server apparatus 10 transmits a positive response including the membership ID of the user who succeeded in the biometric authentication (the person to be authenticated who was determined to be authenticated successfully; an authentication successful person) to the authentication terminal 30 that is a sender of the authentication request.

When the server apparatus 10 fails in the biometric authentication, the server apparatus 10 transmits a negative response to the authentication terminal 30 indicating that the biometric authentication has failed.

The authentication terminal 30 receives an authentication result (authentication success or authentication failure) and performs processing according to the authentication result.

When the authentication terminal 30 received the authentication failure, the authentication terminal 30 notifies the user in front of the authentication terminal 30 (the person to be authenticated) that he or she is not registered as a member. Alternatively, the authentication terminal 30 may display a message that directs the user to an information desk where a clerk is waiting.

When the authentication success is received, the authentication terminal 30 performs processing for payment. Specifically, the authentication terminal 30 identifies a product by reading bar codes, 2D codes, and the like attached to the product (rental video, and so on).

The authentication terminal 30 calculates the payment from the identified product and transmits a "payment request" to the server apparatus 10 that includes payment information such as a product name (rental video title) and a price, and so on, and the membership ID of the user (the authentication successful person).

The server apparatus 10 searches the membership information database using the membership ID included in the payment request as a key and reads the account information from the corresponding entry. The server apparatus 10 performs a payment process using the account information (bank account, credit card information, and so on) read out and the price of the product included in the payment information.

The server apparatus 10 transmits a result of the payment process (successful payment or unsuccessful payment) to the authentication terminal 30.

The authentication terminal 30 executes a process according to the result of the payment process. For example, when the payment is unsuccessful, the authentication terminal 30 may output a message that directs the user to the information center where the clerk is waiting, or may prompt the user to pay in cash. When the payment is successful, the authentication terminal 30 may notify the user that the payment has been completed.

Next, details of the individual apparatuses included in the authentication system according to the first example embodiment will be described.

[Server Apparatus]

Figure 6:
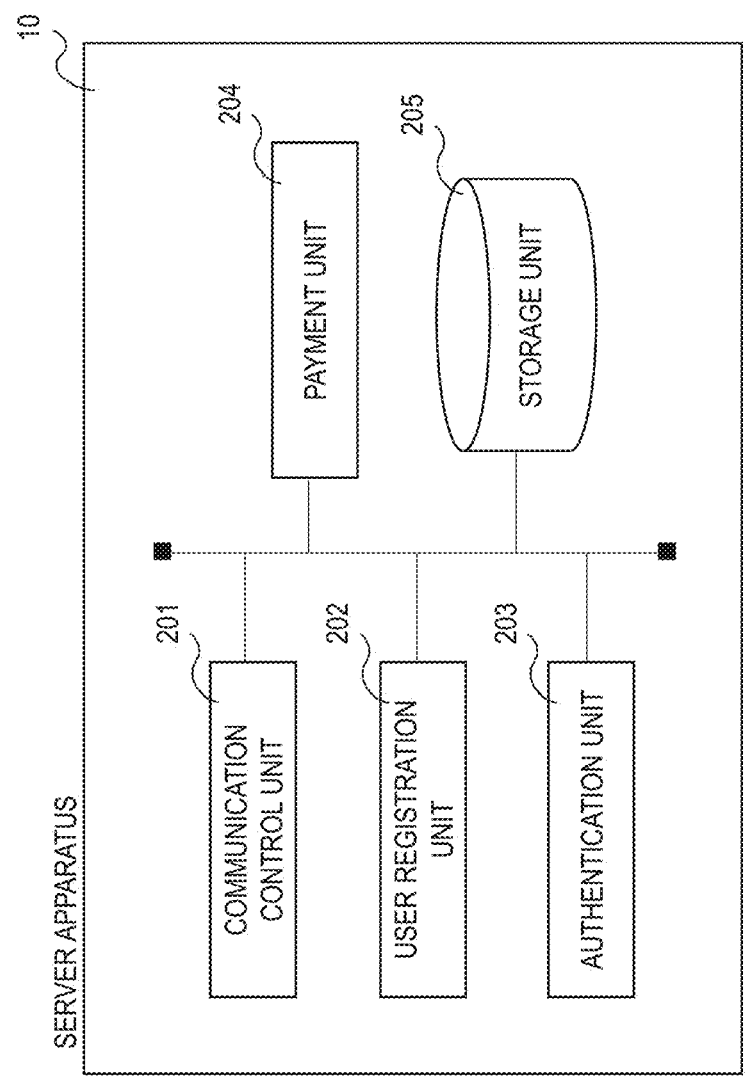
FIG. 6 is a diagram illustrating an example of a processing configuration of a server apparatus according to the first example embodiment.

FIG. 6 is a diagram for illustrating an example of a processing configuration (processing modules) of the server apparatus 10 according to the first example embodiment. As illustrated in FIG. 6, the server apparatus 10 includes a communication control unit 201, a user registration unit 202, an authentication unit 203, a payment unit 204, and a storage unit 205.

The communication control unit 201 is means for controlling communication with other apparatuses. For example, the communication control unit 201 receives data (packets) from the authentication terminals 30. In addition, the communication control unit 201 transmits data to the authentication terminals 30. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201. The communication control unit 201 includes a function as a receiving unit that receives data from other apparatuses and a function as a transmitting unit that transmits data toward other apparatuses.

The user registration unit 202 is means for realizing the above user registration. The user registration unit 202 receives a "user registration request" from the terminal 40. The user registration unit 202 generates a feature value (feature vector consisting of a plurality of feature values) from the acquired face image (biometric information) from terminal 40.

An existing technique can be used to generate process of the feature value, and therefore, detailed description thereof will be omitted. For example, the user registration unit 202 extracts the eyes, nose, mouth, and so on from the face image as the feature points. Next, the user registration unit 202 calculates the location of an individual feature point and the distance between feature points as feature values and generates a feature vector formed by the plurality of feature values (vector information that characterizes the face image).

In addition, the user registration unit 202 generates a membership ID to identify a user (member). The membership ID may be any information as long as the member ship ID can uniquely identify the user registered as a member. For example, the user registration unit 202 may take a unique value each time the user registration request unit 202 processes the user registration request, and use the unique value as the membership ID.

The user information registration unit 202 stores the above generated membership ID, the feature value (biometric information), the personal information, and the account information correspondingly in the membership information database (see FIG. 7). Note that the membership information database shown in FIG. 7 is an example, and is not intended to limit items to be stored. For example, a "face image" may be registered in the membership information database as the biometric information.

Once the biometric information and other information are stored in the membership information database, the user registration unit 202 notifies the user of the generated membership ID. Specifically, the user registration unit 202 transmits a response (a response to the user registration request) that includes the membership ID to the terminal 40.

Figure 8:
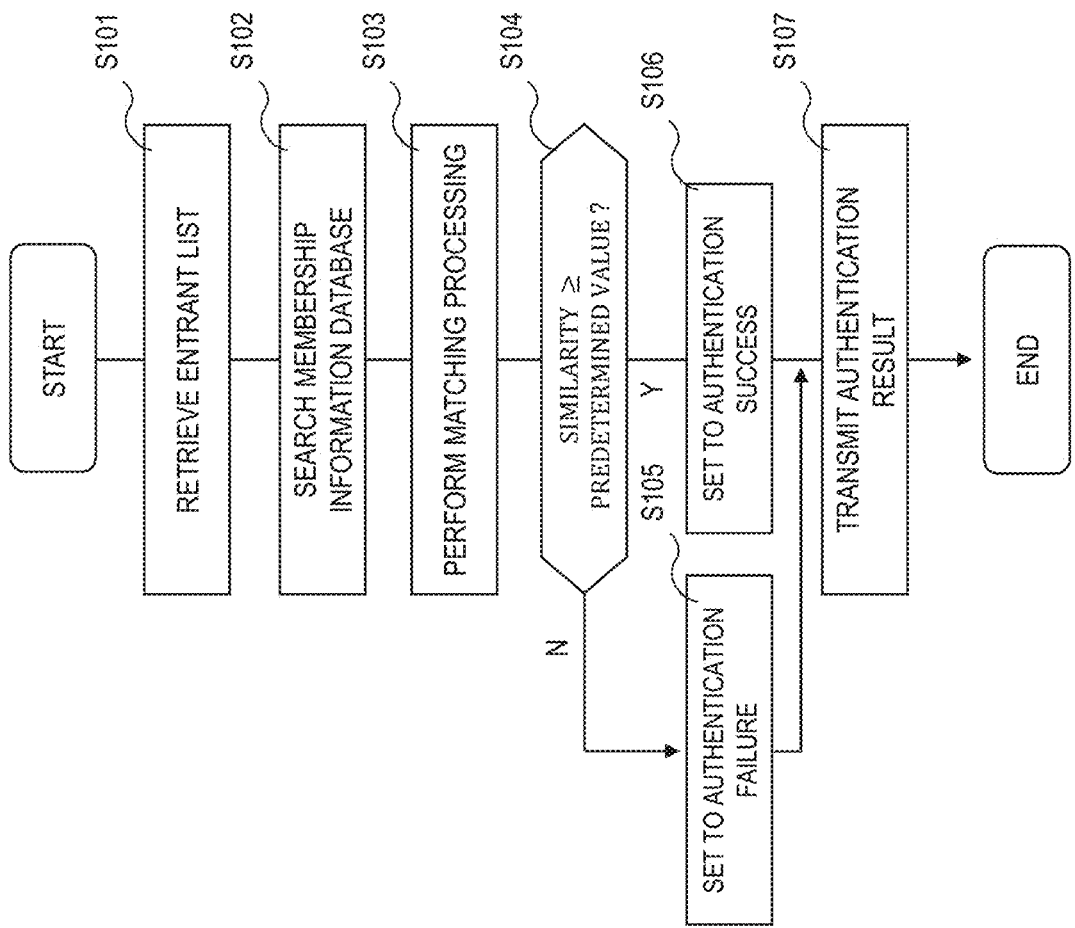
FIG. 8 is a flowchart illustrating an example of an operation of an authentication unit according to the first example embodiment.

The authentication unit 203 is means for processing an authentication request transmitted from a service business operator (the authentication terminal 30). Referring to FIG. 8, an operation of the authentication unit 203 is described.

Upon receiving an authentication request, the authentication unit 203 retrieves an "entrant list" included in the authentication request (step S101).

The authentication unit 203 searches the membership information database using at least one or more membership IDs described in the entrant list as a key and identifies the corresponding entry (step S102).

The authentication unit 203 sets biometric information (feature values) included in the authentication request as a matching target and performs matching processing with biometric information registered in at least one or more of the entries identified above (step S103). More specifically, the authentication unit 203 sets the feature values retrieved from the authentication request as the matching target and performs a one-to-N matching between the feature values and some of the plurality of feature values registered in the membership information database.

Note that since the number of users who enter the store during the same time period is a small number, "N" in the matching processing above is also a small number. For example, even if the information of thirty thousand members is registered in the membership information database, if the number of members staying in the store is "3", then the above N is "3".

In the above matching processing, the authentication unit 203 calculates a similarity between the feature values (feature vectors) to be matched and each of the plurality of feature values on the registration side. For the individual similarity, the chi-squared distance, the Euclidean distance, and so on may be used. A longer distance represents a lower similarity, and a shorter distance represents a higher similarity. If there are no features values whose similarity is greater than a predetermined value (step S104, No branch), the authentication unit 203 sets an authentication result to "authentication failure" (step S105).

If there is a feature value whose similarity is greater than the predetermined value (step S104, Yes branch), the authentication unit 203 sets the authentication result to "authentication success" (step S106).

The authentication unit 203 transmits the authentication result (authentication success, authentication failure) to the authentication terminal 30 (step S107).

When the authentication fails, the authentication unit 203 transmits a negative response to that effect to the authentication terminal 30.

When the authentication is successful, the authentication unit 203 transmits a positive response to that effect to the authentication terminal 30. When the authentication unit 203 transmits the positive response, the authentication unit 203 transmits to the authentication terminal 30 the positive response that includes the membership ID of the entry with the biometric information that has the highest similarity to the matching target among the entries narrowed down by the membership ID. Alternatively, the authentication unit 203 may transmit the positive response to the authentication terminal 30 that further includes the personal information (for example, name) of the entry with the biometric information that has the highest similarity.

In this way, the authentication unit 203 extracts the IDs included in the entrant list (ID list) from the IDs of each of the plurality of users (members). The authentication unit 203 performs the biometric authentication using the biometric information corresponding to the extracted ID and the biometric information that is included in the authentication request. Further, when the biometric authentication is successful, the authentication unit 203 notifies the ID of the authentication successful person to the authentication terminal 30 that is a sender of the authentication request.

The payment unit 204 is means for processing a "payment request" received from the authentication terminal 30. The payment unit 204 retrieves the membership ID from the payment request. The payment unit 204 searches the membership information database using the membership ID as a key and identifies the corresponding entry.

The payment unit 204 reads an account information from the identified entry. The payment unit 204 performs payment processing using the account information and the payment information that is included in the payment request. The payment request unit 204 requests a bank account or a credit card account described in the account information to debit the amount of the payment, or the like, that is included in the payment information.

The payment processing by the payment unit 204 is obvious to those skilled in the art and is different from the purpose of the disclosure of the present application, so a further detailed description is omitted. The storage unit 205 is means for storing information necessary for an operation of the server apparatus 10. The authentication information database is established in the storage unit 205.

[Signage]

The signage 20 is a device that acquires IDs of at least one or more persons staying (persons staying in a predetermined area; persons entering a store) from the terminal 40 possessed by the at least one or more persons staying.

Figure 9:
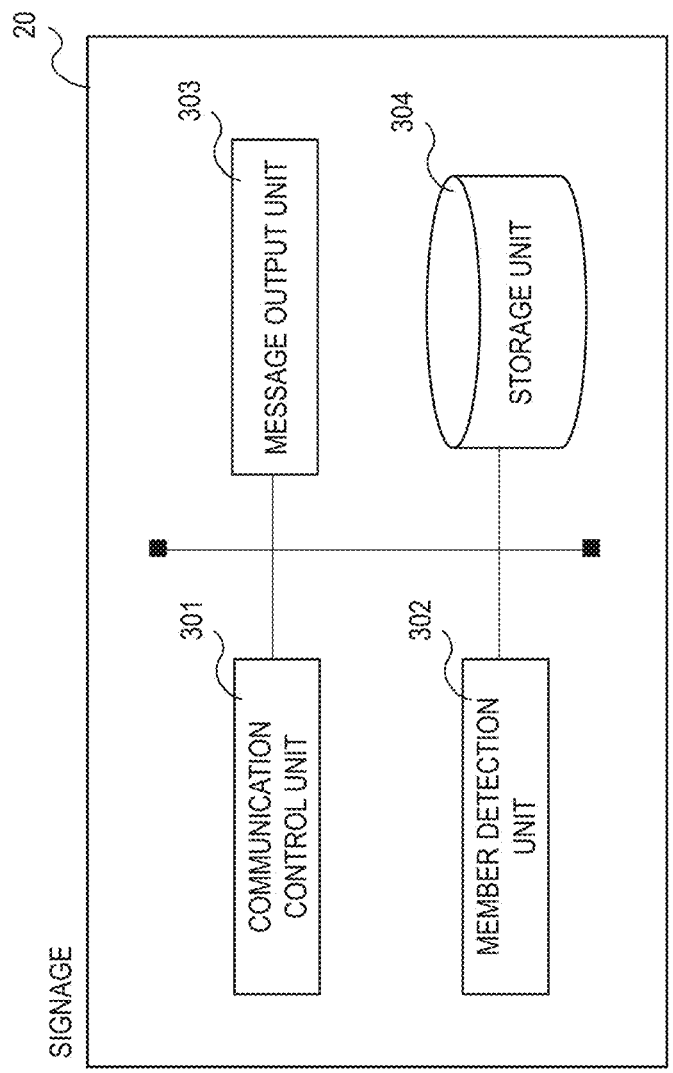
FIG. 9 is a diagram illustrating an example of a processing configuration of a signage according to the first example embodiment.

FIG. 9 is a diagram illustrating an example of a processing configuration (processing modules) of the signage 20 according to the first example embodiment. Referring to FIG. 9, the signage 20 includes a communication control unit 301, a member detection unit 302, a message output unit 303, and a storage unit 304.

The communication control unit 301 is means for controlling communication with other apparatuses. For example, the communication control unit 301 receives data (packets) from the authentication terminal 30. In addition, the communication control unit 301 transmits data to the authentication terminal 30. The communication control unit 301 gives data received from other apparatuses to other processing modules. The communication control unit 301 transmits data acquired from other processing modules to other apparatuses. In this way, other processing modules transmit and receive data to and from other apparatuses via the communication control unit 301.

In addition, the communication control unit 301 also communicates with the terminal 40 possessed by the user by a short-range wireless communication.

The member detection unit 302 is means for detecting a member (user) in a vicinity of the signage 20. The member detection unit 302 transmits a "membership ID transmitting request" periodically or at predetermined timing by the short-range wireless communication.

Since the membership ID transmission request is transmitted by the short-range wireless communication, when the distance between the user holding the terminal 40 and the signage 20 is long, the terminal 40 is unable to receive the request. In the example in FIG. 5, the signage 20 is arranged at a position where the terminal 40 of the user who has entered the store is able to receive the membership ID transmission request.

The member detection unit 302 receives a response that includes a membership ID (a response to the membership ID transmitting request) from the terminal 40 that received the request.

When the membership detection unit 302 acquires the membership ID from the terminal 40, the membership detection unit 302 transmits (simultaneously transmits; broadcasts) a "member entry notification" that includes the membership ID to each of the authentication terminals 30 in the store.

In this way, the member detection unit 302 acquires the membership ID of a visitor (person staying at the store) by communicating via the short-range wireless communication with the terminal 40 possessed by the user who has visited the store. The member detection unit 302 notifies each of a plurality of authentication terminals 30 installed in the store (in a predetermined area) of the acquired membership IDs of the at least one or more persons staying at the store.

The message output unit 303 is means for outputting various messages. For example, when the member detection unit 302 detects the member (when the member detection unit 302 detects that the member has entered the store), the message output unit 303 outputs a message or the like welcoming the entry of the member into the store.

The message output unit 303 may display the message on a display device such as a liquid crystal panel, or may output the message by an acoustic device such as a speaker.

The storage unit 304 is means for storing information necessary for an operation of the signage 20.

[Authentication Terminal]

The authentication terminal 30 is a terminal (apparatus, device) that acquires biometric information of a person to be authenticated.

Figure 10:
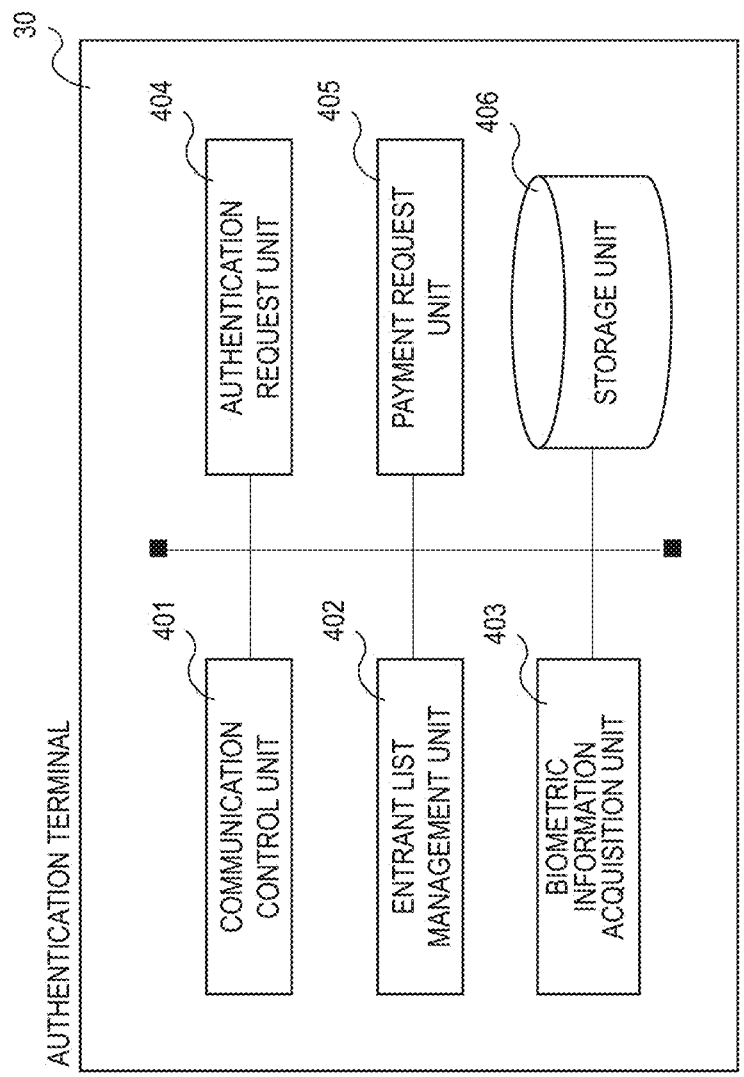
FIG. 10 is a diagram illustrating an example of a processing configuration of an authentication terminal according to the first example embodiment.

FIG. 10 is a diagram illustrating an example of a processing configuration (processing modules) of an authentication terminal 30 according to the first example embodiment. As illustrated in FIG. 10, the authentication terminal 30 includes a communication control unit 401, an entrant list management unit 402, a biometric information acquisition unit 403, an authentication request unit 404, a payment request unit 405, and a storage unit 406.

The communication control unit 401 is means for controlling communication with other apparatuses. For example, the communication control unit 401 receives data (packets) from the server apparatus 10. In addition, the communication control unit 401 transmits data to the server apparatus 10. The communication control unit 401 gives data received from other apparatuses to other processing modules. The communication control unit 401 transmits data acquired from other processing modules to other apparatuses. In this way, other processing modules transmit and receive data to and from other apparatuses via the communication control unit 401.

The entrant list management unit 402 is means for managing an entrant list. When the entrant list management unit 402 receives a member entry notification from the signage 20, the entrant list management unit 402 adds the membership ID included in the notification to the entrant list.

FIG. 11 is a diagram illustrating an example of an entrant list according to the first example embodiment. As shown in FIG. 11, the entrant list stores the date and time of the entry of the member and the membership ID in association with each other. In this way, the authentication terminal 30 arranged in a store (in a predetermined area) maintains the entrant list (ID list) that stores the membership ID of the person staying at the store.

The biometric information acquisition unit 403 is means for controlling a camera and acquiring biometric information (face image) of a user. The biometric information acquisition unit 403 takes images of the front of the apparatus periodically or at predetermined times. The biometric information acquisition unit 403 determines whether the acquired image includes a human face image, and if the human face image is included, extracts the face image from the acquired image data.

An existing technique can be used for the face image detection and extraction processing performed by the biometric information acquisition unit 403, and therefore, detailed description thereof will be omitted. For example, the biometric information acquisition unit 403 may extract a face image (a face area) from the image data by using a learning model learned by a CNN (Convolutional Neural Network). Alternatively, the biometric information acquisition unit 403 may extract a face image by using a technique such as template matching.

The biometric information acquisition unit 403 gives the extracted face image to the authentication request unit 404.

The authentication request unit 404 is means for requesting the server apparatus 10 to authenticate a user. When the authentication of a person to be authenticated becomes necessary, the authentication request unit 404 transmits an authentication request that includes biometric information of the person to be authenticated (the user in front of the authentication terminal 30) and an entrant list to the server apparatus 10.

When the authentication request unit 404 acquires the biometric information (face image) from the biometric information acquisition unit 403, the authentication request unit 404 generates a feature value from the face image. The authentication request unit 404 transmits the authentication request that includes the generated feature value, the entrant list, and a terminal ID to the server apparatus 10.

The terminal ID is an ID that identifies the authentication terminal 30 at each store. A MAC (Media Access Control) address or an IP (Internet Protocol) address of the authentication terminal 30 may be used for the terminal ID.

The authentication request unit 404 receives an authentication result (authentication success, authentication failure) from the server apparatus 10.

When a response from the server apparatus 10 is a "negative response" (when the authentication fails), the authentication request unit 404 notifies the user (the person to be authenticated) to that effect. For example, the authentication request unit 404 notifies the person to be authenticated (the user standing in front of the authentication terminal 30) that he or she is not registered as a member. Alternatively, the authentication request unit 404 notifies the person to be authenticated to go to the information center or the like where the clerk is present. Alternatively, the authentication request unit 404 may output a message or the like to the person who has failed in authentication (the person to be authenticated who has been determined to have failed in authentication), prompting him or her to register as a member.

When a response from the server apparatus 10 is a "positive response" (when the authentication is successful), the authentication request unit 404 retrieves the membership ID included in the response. The authentication request unit 404 hands over the retrieved membership ID to the payment request unit 405.

The payment request unit 405 is means for making a request regarding a payment for an authentication successful person. The payment request unit 405 identifies a product (for example, a rental video) by any means. For example, the payment request unit 405 identifies the product by means of a tag, a bar code, or a two-dimensional code attached to the rental video.

The payment request unit 405 calculates a price to be charged to the user based on the identified product and generates payment information. The payment request unit 405 transmits the "payment request" that includes the generated payment information, the membership ID, and the terminal ID to the server apparatus 10.

The payment request unit 405 acquires a result of the payment (successful payment, unsuccessful payment) from the server apparatus 10. The payment request unit 405 performs processing according to the result of the payment.

For example, when the payment is successful, the payment request unit 405 notifies the user that the payment has been completed. When the payment is unsuccessful, the payment request unit 405 notifies the user of the failure and instructs him or her to go to the clerk.

In this way, the payment request unit 405 provides a service (product payment service) to the authentication successful person by using the membership ID of the authentication successful person.

The storage unit 406 stores information necessary for operations of the authentication terminal 30.

[Terminal]

Examples of the terminal 40 include a portable terminal device such as a smartphone, a portable phone, a game console, or a tablet. However, it is not intended to limit the terminal 40 to these examples. The "terminal" in the present application can be any device that can be carried by a person.

Figure 12:
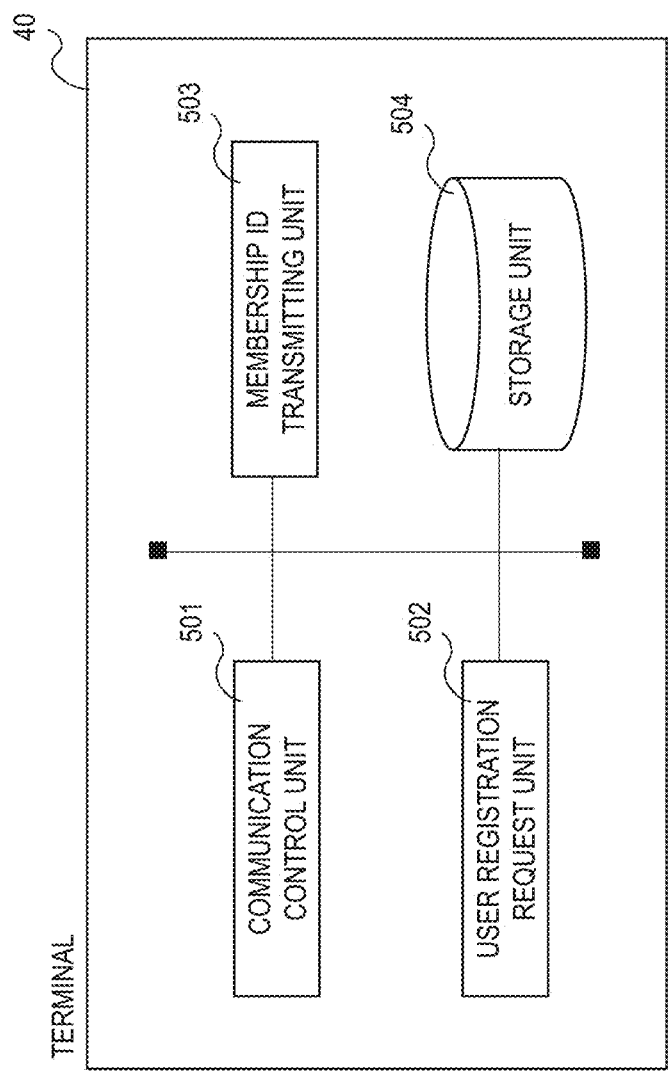
FIG. 12 is a diagram illustrating an example of a processing configuration of a terminal according to the first example embodiment.

FIG. 12 is a diagram illustrating an example of a processing configuration (processing modules) of the terminal 40 according to the first example embodiment. Referring to FIG. 12, the terminal 40 includes a communication control unit 501, a user registration request unit 502, a membership ID transmitting unit 503, and a storage unit 504.

The communication control unit 501 is means for controlling communication with other apparatuses. For example, the communication control unit 501 receives data (packets) from the server apparatus 10. In addition, the communication control unit 501 transmits data to the server apparatus 10. The communication control unit 501 gives data received from other apparatuses to other processing modules. The communication control unit 501 transmits data acquired from other processing modules to other apparatuses. In this way, other processing modules transmit and receive data to and from other apparatuses via the communication control unit 501.

The communication control unit 501 also communicates with the signage 20 installed at an entrance and exit of the store, and so on, by a short-range wireless communication.

The user registration request unit 502 is means for realizing a member registration for a user. In response to an operation by the user, the user registration request unit 502 acquires biometric information (face image), personal information (name, and so on), and account information (bank account, and so on).

The user registration request unit 502 transmits a user registration request that includes the acquired biometric information, the acquired personal information, and the acquired account information to the server apparatus 10.

When the user registration request unit 502 receives a response that includes the membership ID, the user registration request unit 502 stores the membership ID in the storage unit 504.

The membership ID transmitting unit 503 is means for transmitting a membership ID to the signage 20. When the membership ID transmitting unit 503 receives a "membership ID transmission request", the membership ID transmitting unit 503 transmits a response that includes the membership ID stored in the storage unit 504 to the signage 20. For example, the membership ID transmitting unit 503 transmits the response to the membership ID transmission request by using the short-range wireless communication means such as Bluetooth (registered trademark).

The storage unit 504 is means for storing information necessary for the operation of the terminal 40.

[System Operation]

Figure 13:
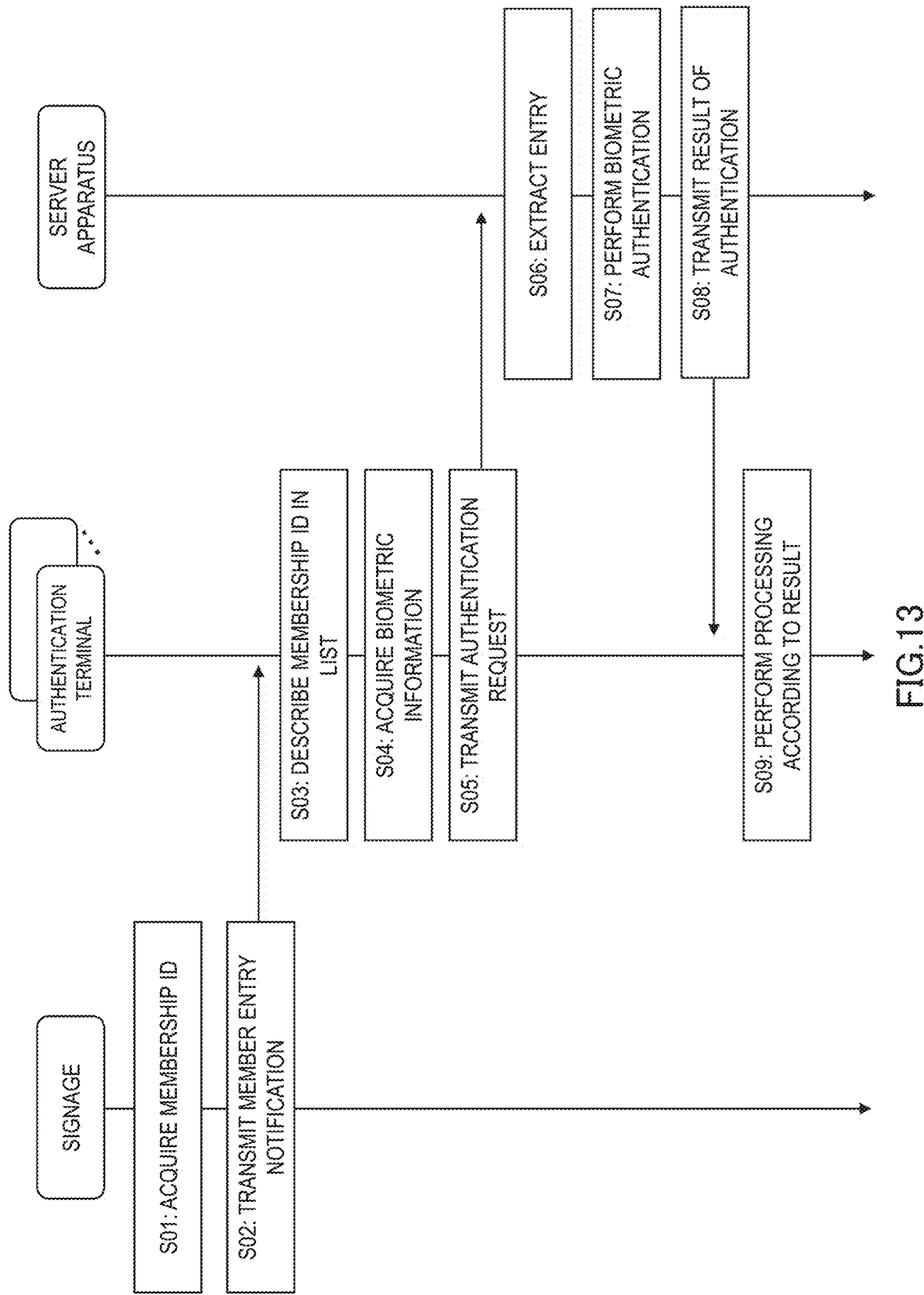
FIG. 13 is a sequence diagram illustrating an example of an operation in the authentication system according to the first example embodiment.

Next, operations in the authentication system according to the first example embodiment will be described. Note that a description of an operation related to the user registration is omitted. FIG. 13 is a sequence diagram illustrating an example of an operation in the authentication system according to the first example embodiment.

The signage 20 acquires a membership ID from a response to a membership ID transmission request (step S01).

The signage 20 transmits a member entry notification that includes the acquired membership ID to each of the authentication terminals 30 (step S02).

Each of the authentication terminals 30 describes the acquired membership ID in an entrant list (describe the membership ID in a list; step S03).

When the authentication terminal 30 detects a user (a person to be authenticated) in front of the authentication terminal 30, the authentication terminal 30 acquires biometric information (step S04).

The authentication terminal 30 transmits an authentication request that includes the biometric information, the entrant list, and a terminal ID to the server apparatus 10 (step S05).

The server apparatus 10 extracts an entry for the membership ID described in the entrant list from the membership information database (step S06).

The server apparatus 10 performs biometric authentication using the biometric information included in the authentication request and the biometric information of the extracted entry (step S07).

The server apparatus 10 transmits a result of the authentication to the authentication terminal 30 (step S08).

The authentication terminal 30 performs processing according to the result of the authentication (step S09). When the authentication fails, the authentication terminal 30 notifies the user to that effect. When the authentication is successful, the authentication terminal 30 performs the processing related to a payment (transmits a payment request).

[Variations According to the First Example Embodiment]

In the above example embodiment, it is described that the signage 20 acquires the membership ID from the terminal 40 of the user. However, the signage 20 does not have to be installed in the store. Instead of the signage 20, the authentication terminal 30 installed at various locations in the store may acquire the membership ID from the terminal 40.

Figure 14:
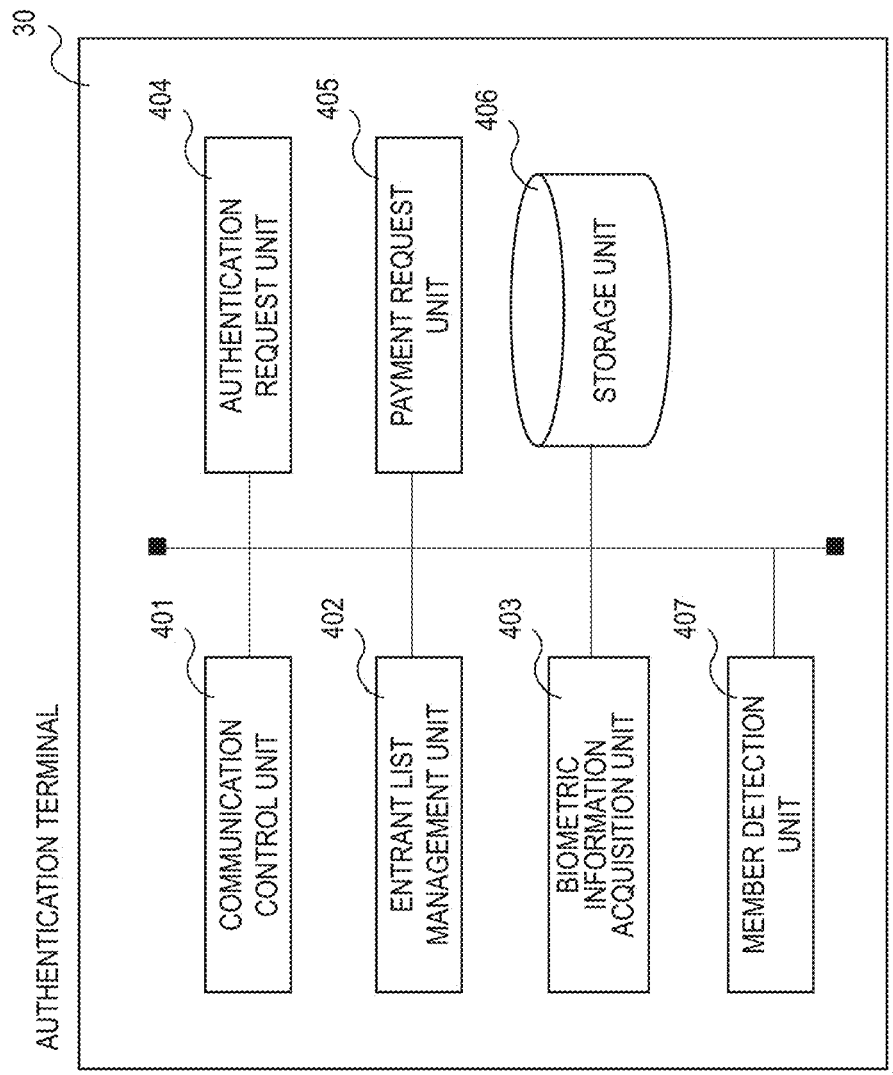
FIG. 14 is a diagram illustrating an example of a processing configuration of an authentication terminal of a variation according of the first example embodiment.

Specifically, the authentication terminal 30 may include a member detection function of the signage 20. In this case, the authentication terminal 30 may include a member detection unit 407, as shown in FIG. 14. Since a basic operation of the member detection unit 407 can be the same as the operation of the member detection unit 302 of the signage 20, a detailed description is omitted.

In addition, the communication control unit 401 included in the authentication terminal 30 in a variation according to the first example embodiment only needs to be compatible with a short-range wireless communication such as Bluetooth (registered trademark).

When the member detection unit 407 acquires a membership ID in response to a membership ID transmitting request, the member detection unit 407 hands over the acquired membership ID to the entrant list management unit 402 of its own device. The member detection unit 407 transmits a "member entry notification" that includes the membership ID to the other authentication terminal 30.

Figure 5:
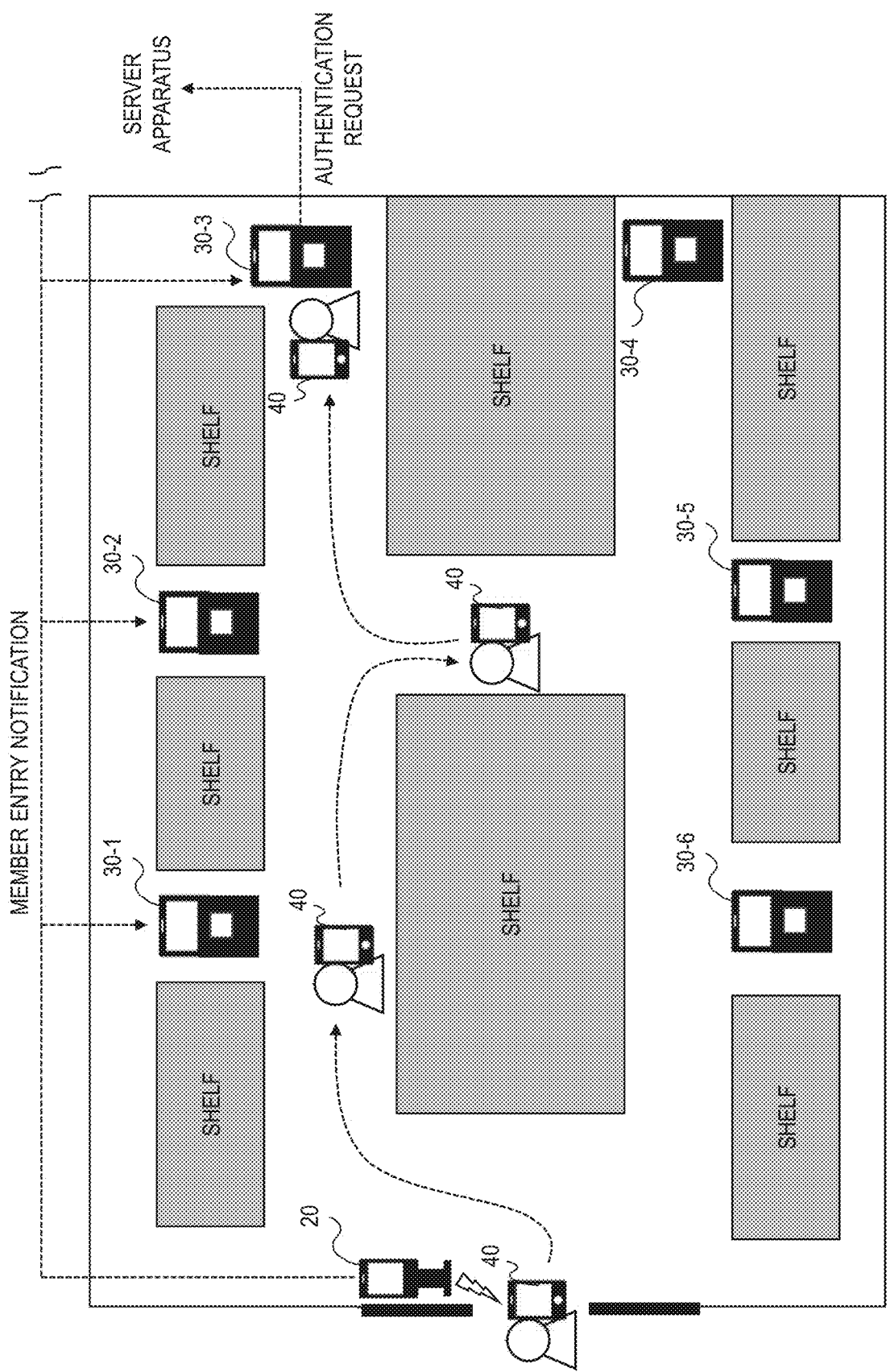
FIG. 5 is a diagram illustrating an operation of the authentication system according to the first example embodiment.

For example, consider a case in FIG. 5 where the signage 20 is not installed in a storefront (entrance and exit). In this case, for example, when the authentication terminal 30-1 acquires a membership ID, the authentication terminal 30-1 transmits a member entry notification that includes the membership ID to the other authentication terminals 30-2 to 30-6.

In this way, even if there is no signage 20 installed in the storefront, each authentication terminal 30 acquires the membership ID through the short-range wireless communication, thereby creating an entrant list of persons staying in the store. Since it is possible to create the entrant list, the server apparatus 10 can realize narrowing down authentication targets by using the membership ID.

As described above, in the authentication system according to the first example embodiment, the membership ID is transmitted from terminal 40 to edge devices (the signage 20 and the authentication terminal 30) in the store. When biometric authentication is required, the authentication terminal 30 transmits biometric information of a person to be authenticated to a cloud side (authentication center; the server apparatus 10) along with a list that includes membership IDs of users staying in the store, and the authentication terminal 30 requests that the biometric authentication be performed. The server apparatus 10 narrows down the users staying in the store by using the acquired list, sets the narrowed-down users to a registration side, and performs the biometric authentication. Since the users are narrowed down by the membership ID, highly accurate biometric authentication can be realized. In addition, in the authentication system according to the first example embodiment, the target is not narrowed down when the user enters the store, but rather at the timing when biometric authentication is required (in other words, at the timing when payment is required). Such a behavior eliminates the need for the server apparatus 10 to perform processing related to a user who has left the store without any consumption behavior. As a result, no resources of the server apparatus 10 is wasted and the throughput of biometric authentication is not lowered.

In addition, from the point of view of the user, it is advantageous that the user can enjoy the convenience of biometric authentication without having to carry around personal information such as biometric information, which is difficult to handle. Furthermore, since payment can be made by biometric authentication, there is no need to enter passwords or perform other complicated operations that are usually required for normal payment. Moreover, when the user enters a store, the user enables a short-range wireless communication function of the terminal 40 that he or she possesses, and so on, thereby increasing points of contact between the user and the terminal 40.

In addition, from the point of view of the service business operator who uses biometric authentication, it is sufficient that the signage 20 acquires the membership ID from the terminal 40 of the user, and the authentication terminal 30 shares the membership ID, which has the advantage that more devices and complex processing are not required. In other words, the authentication system according to the first example embodiment has the advantage of requiring less burden and consideration on the part of the service business operator.

Second Example Embodiment

Next, a second example embodiment will be described in detail with reference to drawings.

In the first embodiment, it is described that biometric authentication is performed on a cloud side (authentication center; the server apparatus 10). However, the biometric authentication may be performed on a local side (on an edge side; on a store side).

As a configuration of the authentication system according to the second example embodiment can have the same configuration as that according to the first example embodiment, the description corresponding to FIG. 2 will be omitted. In addition, as a processing configuration of a signage 20 according to the second example embodiment can have the same processing configurations as those according to the first example embodiment, description thereof will be omitted.

The following description will be made with a focus on the difference between the first example embodiment and the second example embodiment.

When the signage 20 according to the second example embodiment acquires a membership ID from a terminal 40 of the user, the signage 20 transmits the membership ID to a server apparatus 10 instead of transmitting the membership ID to an authentication terminal 30 in a store. In other words, the signage 20 notifies the server apparatus 10 of the membership ID of a person staying in the store (in a predetermined area).

More specifically, when the member detection unit 302 of the signage 20 acquires the membership ID from the terminal 40, the member detection unit 302 transmits a member entry notification that includes the membership ID and a store ID to the server apparatus 10.

Note that the store ID is information that uniquely identifies a service business operator participating in the authentication system. For example, in FIG. 2, different store IDs are set for service business operator A and service business operator B.

In addition, the terminal ID or the store ID is shared between the server apparatus 10 and the terminals (the signage 20 and the authentication terminal 30) by an arbitrary method. For example, a system administrator determines the terminal ID or the store ID, and sets the determined terminal ID in the server apparatus 10. In addition, the system administrator notifies the service business operator of the determined terminal ID. The service business operator sets the notified terminal ID to the terminals (the signage 20 and the authentication terminal 30).

Figure 15:
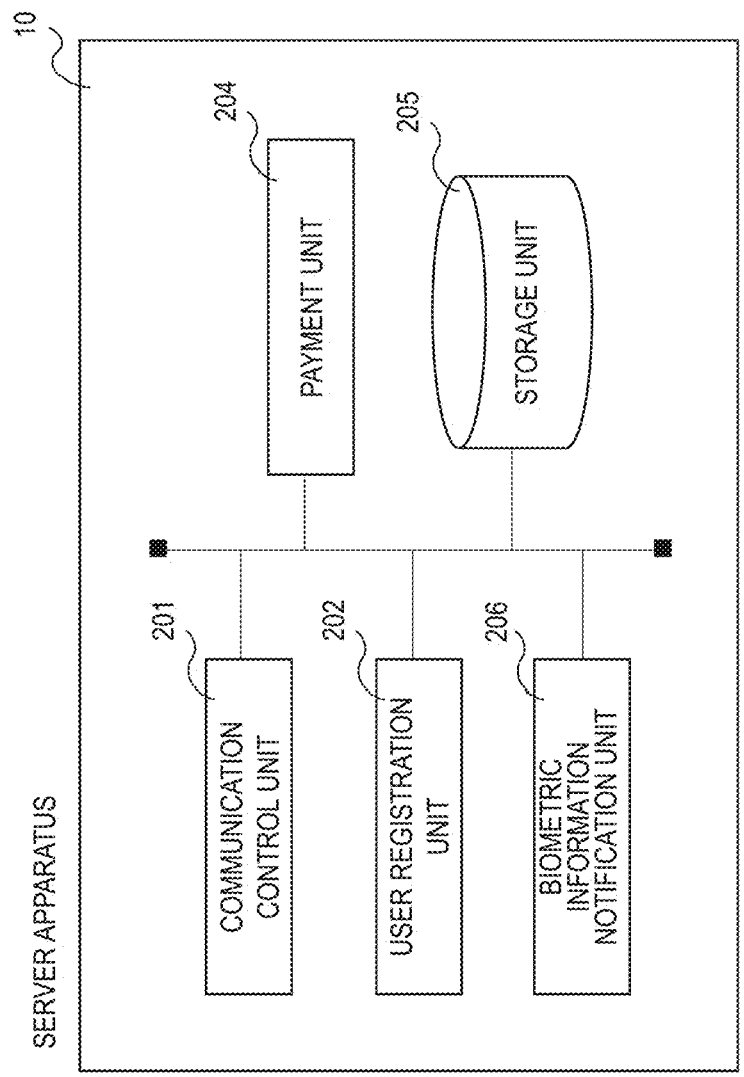
FIG. 15 is a diagram illustrating an example of a processing configuration of a server apparatus according to a second example embodiment.

FIG. 15 is a diagram for illustrating an example of a processing configuration (processing modules) of the server apparatus 10 according to the second example embodiment. Referring to FIG. 15, the server apparatus 10 according to the second example embodiment includes a biometric information notification unit 206 in place of the authentication unit 203 of the server apparatus 10 according to the first example embodiment.

The biometric information notification unit 206 is means for notifying the authentication terminal 30 of biometric information corresponding to the membership ID notified by the signage 20 among the IDs of a plurality of users.

When the biometric information notification unit 206 receives a member entry notification, the biometric information notification unit 206 searches the membership information database using the membership ID included in the member entry notification as a key, and identifies the corresponding entry. The biometric information notification unit 206 notifies biometric information of the identified entry (biometric information corresponding to the acquired membership ID) to each authentication terminal 30 of the store where the signage 20 is installed.

Specifically, the biometric information notification unit 206 transmits a "biometric information notification" that includes the biometric information (feature value) of the identified entry and membership ID to each of the authentication terminals 30.

Note that the biometric information notification unit 206 identifies the store that is a sender of the member entry notification and a plurality of authentication terminals 30 installed in the store, based on the store ID. Specifically, the biometric information notification unit 206 identifies the authentication terminal 30 to which the biometric information notification is to be transmitted by referring to table information that stores the store ID and the terminal ID of the authentication terminal 30 in correspondence each other.

The biometric information notification unit 206 transmits the "biometric information notification" to each of the authentication terminals 30 identified as a transmission destination. In other words, the server apparatus 10 transmits the biometric information of the corresponding member to at least one or more authentication terminals 30 in response to receiving the member entry notification.

Figure 16:
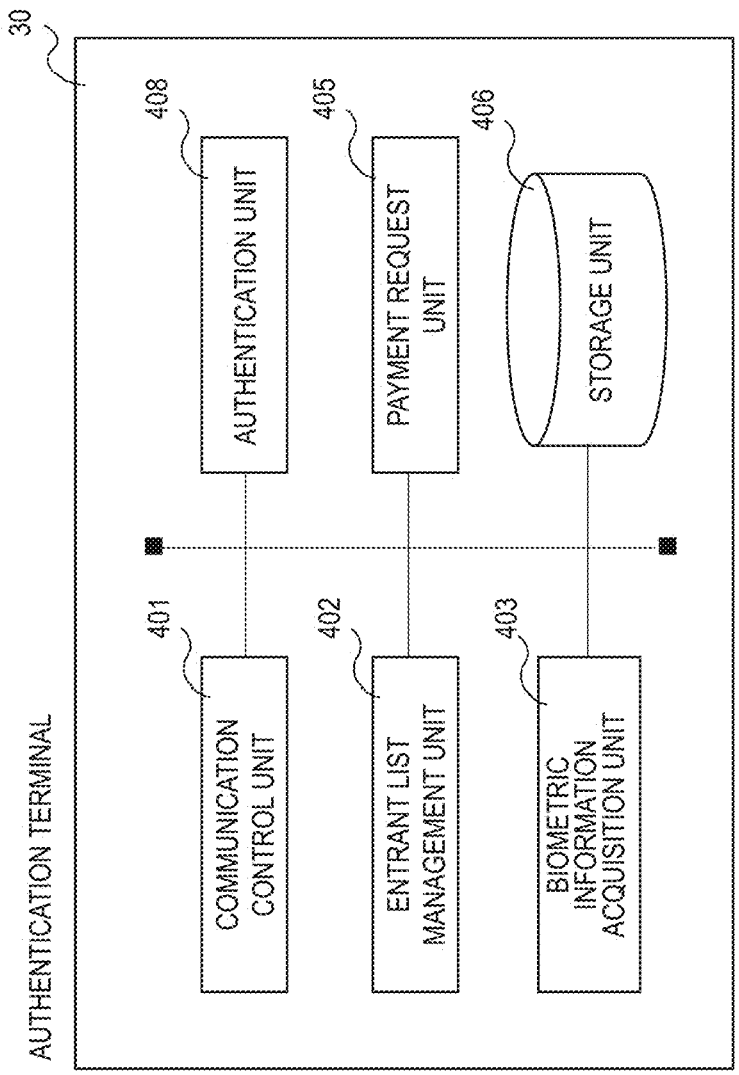
FIG. 16 is a diagram illustrating an example of a processing configuration of an authentication terminal according to the second example embodiment.

FIG. 16 is a diagram illustrating an example of a processing configuration (processing modules) of the authentication terminal 30 according to the second example embodiment. Referring to FIG. 16, the authentication terminal 30 according to the second example embodiment includes an authentication unit 408 in place of the authentication request unit 404 of the authentication terminal 30 according to the first example embodiment.

When the entrant list management unit 402 receives a biometric information notification, the entrant list management unit 402 describes a membership ID and biometric information described in the notification in the entrant list (see FIG. 17). In this way, each of the authentication terminals 30 stores the biometric information acquired from the server apparatus 10 (biometric information of a person entering the store) internally. In other words, the authentication terminal 30 stores the biometric information notified by the server apparatus 10 in the entrant list (biometric information list) and accumulates biometric information of persons staying in the store.

The authentication terminal 30 acquires biometric information of a user and performs biometric authentication when making a payment. Specifically, when the authentication unit 408 acquires biometric information of a person to be authenticated from the biometric acquisition unit 403, the authentication unit 408 performs biometric authentication using the biometric information described in the entrant list and the biometric information acquired from the biometric acquisition unit 403. In other words, when an authentication of the person to be authenticated becomes necessary, the authentication unit 408 performs biometric authentication using the biometric information acquired by the biometric acquisition unit 403 and the biometric information stored in the list (entrant list).

Note that since a basic operation of the authentication unit 408 can be the same as the operation of the authentication unit 203 described in the first example embodiment, a more detailed description of the authentication unit 408 will be omitted.

When the biometric authentication is successful, the authentication unit 408 hands over a membership ID of the authentication successful person to the payment request unit 405. The payment request unit 405 transmits a payment request that includes the membership ID and payment information to the server apparatus 10.

For example, in the example in FIG. 5, the signage 20 transmits a member entry notification that includes a membership ID of the user who possesses the terminal 40 to the server apparatus 10. The server apparatus 10 reads biometric information corresponding to the membership ID from the membership information database and notifies the authentication terminals 30-1 to 30-6 (transmits biometric information notification).

Each of the authentication terminals 30 stores the notified biometric information and the membership ID in association with each other.

As shown in FIG. 5, when a user makes a payment using the authentication terminal 30-3, the authentication terminal 30-3 performs biometric authentication using biometric information accumulated internally and identifies a membership ID of the user. The authentication terminal 30 transmits a payment request that includes the identified membership ID and the payment information to the server apparatus 10.

[System Operation]

Figure 18:
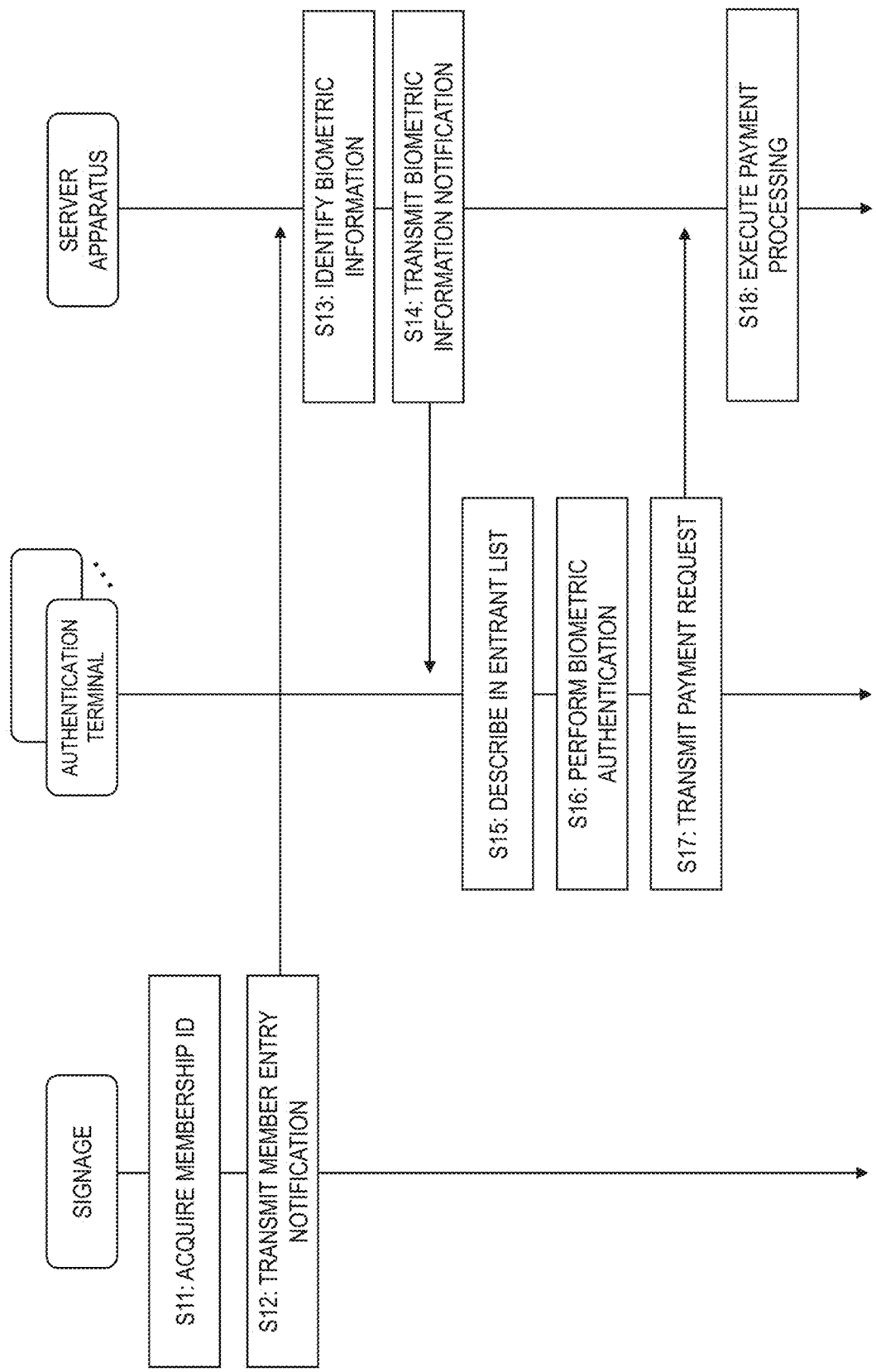
FIG. 18 is a sequence diagram illustrating an example of an operation in the authentication system according to the second example embodiment.

Next, operations in the authentication system according to the second example embodiment will be described. FIG. 18 is a sequence diagram illustrating an example of an operation in the authentication system according to the second example embodiment.

The signage 20 acquires a membership ID from a response to a membership ID transmission request (step S11).

The signage 20 transmits a member entry notification that includes the acquired membership ID to the server apparatus 10 (step S12).

The server apparatus 10 identifies biometric information of the member corresponding to the membership ID included in the member entry notification (step S13).

The server apparatus 10 transmits a biometric information notification to each of the authentication terminals 30 that includes the identified biometric information and the membership ID (step S14).

Each of the authentication terminals 30 describes the acquired membership ID and the acquired biometric information in the entrant list (step S15).

When the authentication terminal 30 detects a user (a person to be authenticated) in front of the authentication terminal 30, the authentication terminal 30 performs biometric authentication (step S16). The authentication terminal 30 performs biometric authentication using the internally accumulated biometric information of the entrant.

When the biometric authentication is successful, the authentication terminal 30 transmits a payment request that includes the membership ID of the person to be authenticated to the server apparatus 10 (step S17).

The server apparatus 10 executes a payment processing using payment information and an account information (step S18).

[Variation 1 According to the Second Example Embodiment]

In the above second example embodiment, it is described that the membership ID is transmitted to the server apparatus 10 at the timing when the member enters the store, and the server apparatus 10 notifies each of the authentication terminals 30 of the biometric information corresponding to the membership ID. However, the membership ID may be transmitted to the server apparatus 10 at the timing when biometric authentication is required at the authentication terminal 30 (timing of payment). For example, when the signage 20 acquires a membership ID from the terminal 40, the signage 20 manages the acquired membership ID using the "entrant list".

When the authentication terminal 30 is required to make a payment (when biometric authentication is required to be performed), the authentication terminal 30 transmits an "entrant list request" to the signage 20. When the signage 20 receives the request, the signage 20 transmits the entrant list to the server apparatus 10.

The server apparatus 10 reads biometric information corresponding to the member ID described in the entrant list from the membership information database and transmits a biometric information notification that includes the membership ID and the biometric information to the authentication terminal 30.

The authentication terminal 30 identifies a user in front of the authentication terminal 30 by setting the biometric information described in the biometric information notice as biometric information on the registration side and performing biometric authentication. The authentication terminal 30 transmits a payment request that includes the membership ID of the identified user to the server apparatus 10.

In this way, even when biometric authentication is performed on the edge side (store side or service business operator side), the membership ID may be transmitted to the server apparatus 10 at the timing when biometric authentication is required, that is, at the timing of payment. The server apparatus 10 may narrow down the members staying in the store by their membership IDs and notify the authentication terminal 30 of the biometric information of the members narrowed down.

[Variation 2 According to the Second Example Embodiment]

In the above second example embodiment, it is described when the biometric information of the member who entered the store is stored in the authentication terminal 30, and the authentication terminal 30 performs biometric authentication. Here, the biometric information transmitted from the server apparatus 10 (cloud side) to the store side (edge side) may be stored by a store server installed in each store, instead of being stored by each of the authentication terminals 30.

Figure 19:
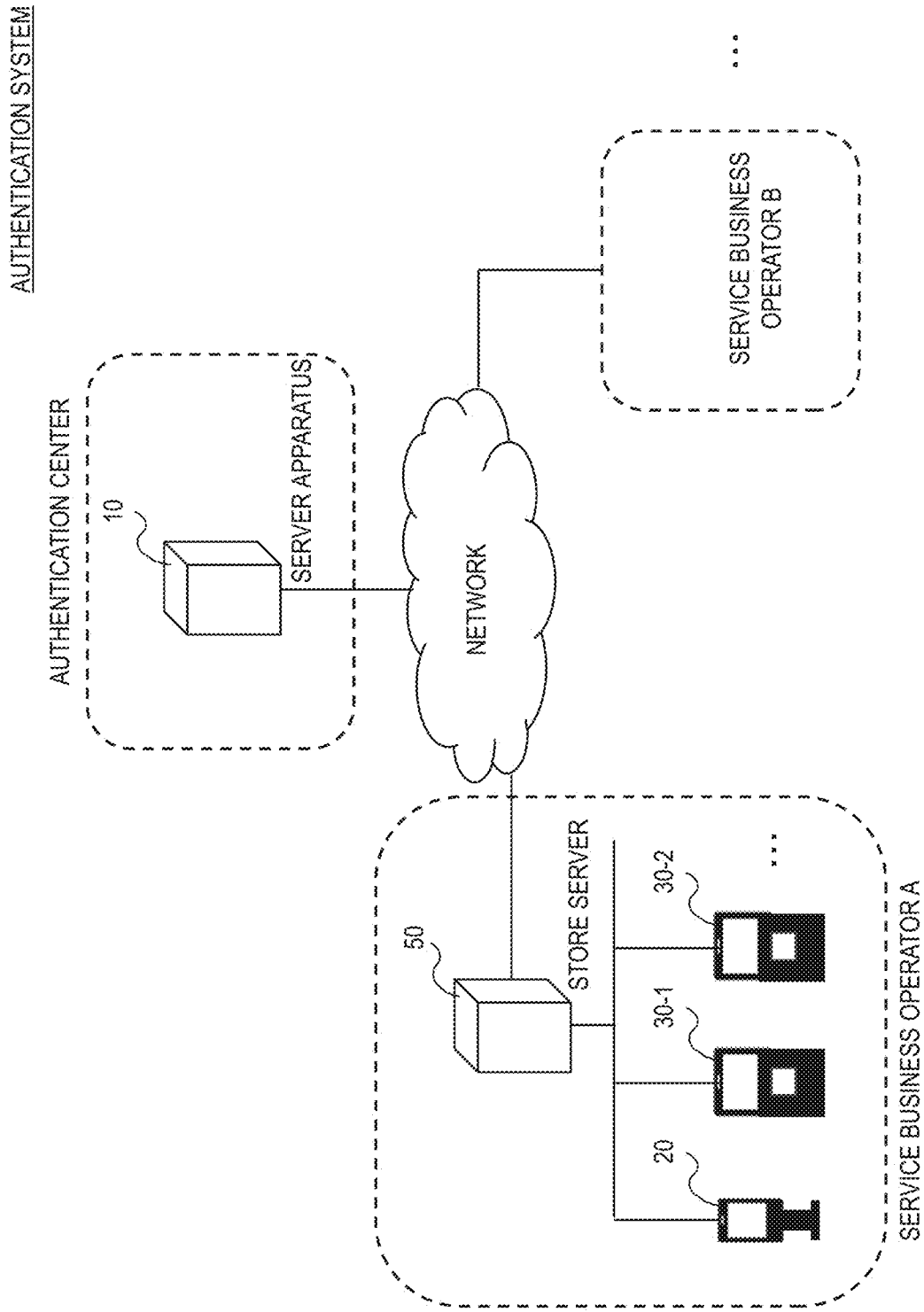
FIG. 19 is a diagram illustrating an example of a schematic configuration of an authentication system of a variation two according to the second example embodiment.

Specifically, as shown in FIG. 19, a store server 50 may be installed in each store, and the terminals on the store side (the signage 20 and the authentication terminal 30) and the store server 50 may be connected to each other. The store server 50 is connected to the server apparatus 10. Note that the store server 50 is a "second server apparatus" if the server apparatus 10 is a "first server apparatus.

When the server apparatus 10 receives a member entry notification, the server apparatus 10 transmits a "biometric information notification" that includes biometric information corresponding to the received membership ID and the membership ID to the store server 50.

The store server 50 stores the received membership ID and the received biometric information in the entrant list.

When biometric authentication is required, the authentication terminal 30 transmits biometric information of a person to be authenticated to the store server 50. More specifically, the authentication terminal 30 transmits an authentication request that includes the biometric information of the person to be authenticated to the store server 50 when payment is required. The store server 50 performs biometric authentication using the accumulated biometric information (the biometric information described in the entrant list) and the biometric information acquired from the authentication terminal 30.

When the biometric authentication is successful, the store server 50 transmits a membership ID of an authentication successful person to the authentication terminal 30. The authentication terminal 30 transmits a payment request that includes the membership ID and payment information to the server apparatus 10. The authentication terminal 30 may transmit the payment request to the server apparatus 10 via the store server 50 or may directly transmit the payment request to the server apparatus 10.

Note that in the variation 2 according to the second example embodiment, the timing at which the signage 20 transmits the terminal ID to the server apparatus 10 and the biometric information corresponding to the terminal ID is transmitted to the store server 50 may be at the time of payment by the user.

A processing configuration of an individual apparatus in the variation 2 according to the second example embodiment will be described.

Regarding the server apparatus 10, the processing configuration can be the same as the processing configuration described with reference to FIG. 15. The biometric information notification unit 206 may transmit the biometric information notification toward the store server 50.

Regarding the signage 20, the processing configuration can be the same as the processing configuration described with reference to FIG. 9. The member detection unit 302 may transmit a membership entry notification to the server apparatus 10 via the store server 50, or the member detection unit 302 may transmit the notification directly to the server apparatus 10.

Figure 20:
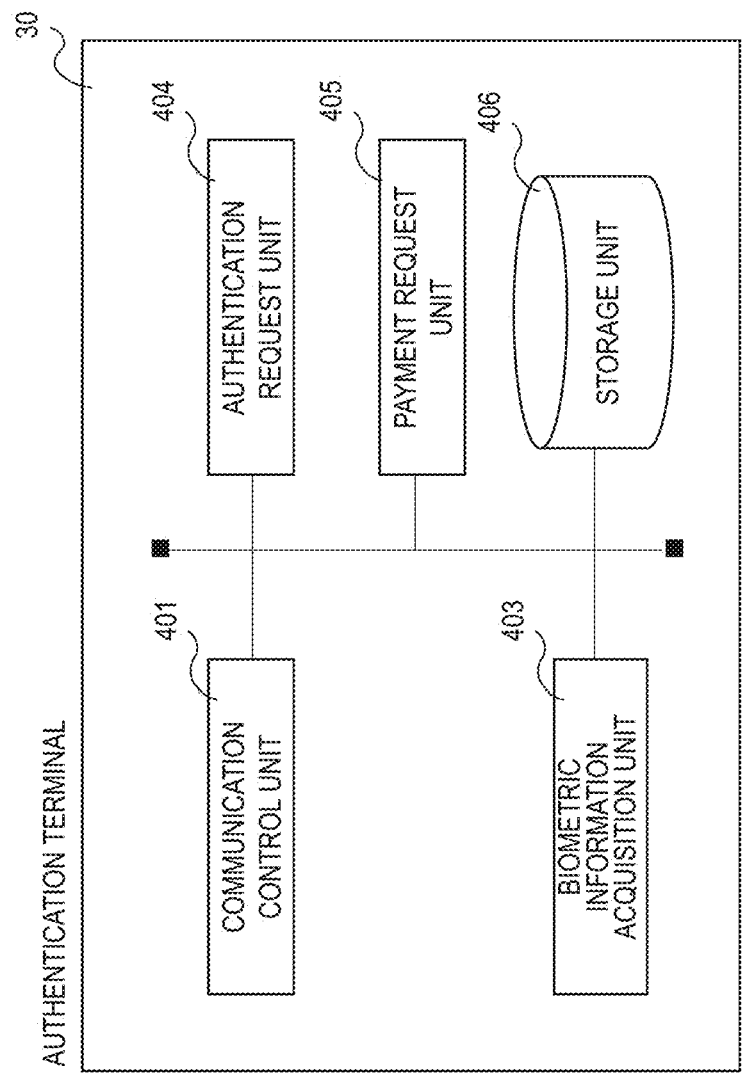
FIG. 20 is a diagram illustrating an example of a processing configuration of an authentication terminal of the variation two according to the second example embodiment.

The authentication terminal 30 may have a configuration as shown in FIG. 20. As shown in FIG. 20, the authentication terminal 30 of the variation 2 according to the second example embodiment may not include the entrant list management unit 402. The authentication request unit 404 transmits an authentication request that includes biometric information of a person to be authenticated to the store server 50, and acquires a membership ID of an authentication successful person from the store server 50.

Figure 21:
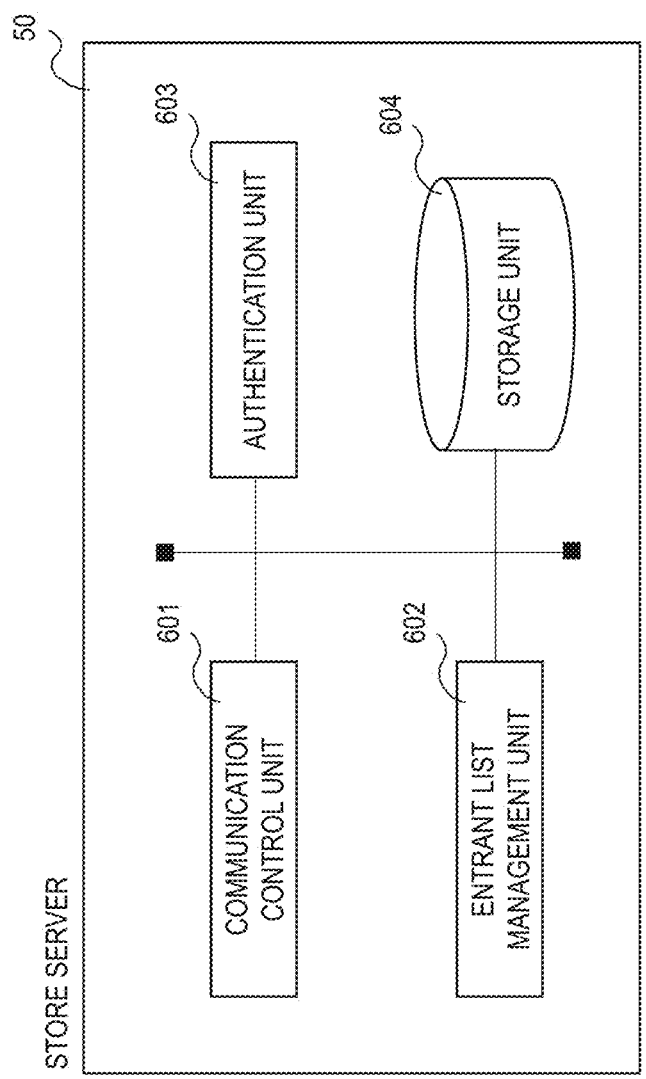
FIG. 21 is a diagram illustrating an example of a processing configuration of a store server of the variation two according to the second example embodiment.

FIG. 21 is a diagram illustrating an example of a processing configuration (processing modules) of the store server 50 in the variation 2 according to the second example embodiment. As shown in FIG. 21, the store server 50 includes a communication control unit 601, an entrant list management unit 602, an authentication unit 603, and a storage unit 604.

Note that basic operation of each processing module included in the store server 50 can be the same as the operation of the processing module with the same name that has already been described, so a detailed description will be omitted.

For example, the entrant list management unit 602 receives a biometric information notification from the server apparatus 10 and adds the membership ID and biometric information of the user (member) staying in the store to the entrant list. In addition, the authentication unit 603 processes an authentication request from the authentication terminal 30, and when biometric authentication is successful, the authentication unit 603 notifies the authentication terminal 30 of a membership ID of an authentication successful person.

In this way, the authentication system may further include the store server 50 that receives biometric information from the server apparatus 10 instead of the authentication terminal 30. In this case, the authentication terminal 30 transmits an authentication request that includes the biometric information of the person to be authenticated to the store server 50. The store server 50 performs a biometric authentication using the biometric information received from the server apparatus 10 and the biometric information that included in the authentication request.

Note that in the second example embodiment the authentication terminal 30 may also include the function of the signage 20. Also in the second example embodiment, the authentication terminal 30 may acquire a membership ID from the terminal 40 of the user, instead of the signage 20. The authentication terminal 30 may transmit the acquired membership ID to the server apparatus 10.

As described above, in the system according to the second example embodiment, a membership ID of a user who has entered a store is transmitted to the server apparatus 10. The server apparatus 10 identifies biometric information of the corresponding user from the membership ID and notifies an edge side (service business operator side) of the identified biometric information. On the edge side, the notified biometric information is accumulated internally and used for biometric authentication. The second example embodiment also improves the accuracy of biometric authentication because targets for biometric authentication are narrowed down by membership IDs.

Figure 22:
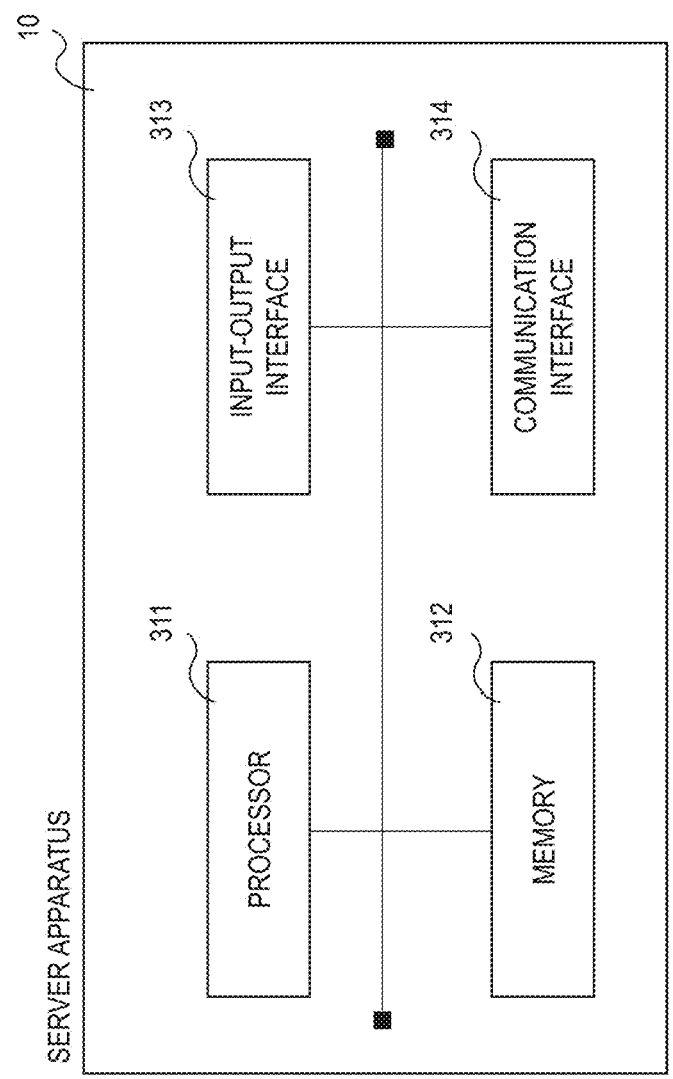
FIG. 22 is a diagram illustrating an example of a hardware configuration of a server apparatus according to the present application.

Next, a hardware configuration of an individual apparatus that constitutes the authentication system will be described. FIG. 22 is a diagram illustrating an example of a hardware configuration of the server apparatus 10.

The server apparatus 10 can be configured by an information processing apparatus (so-called computer) and has a configuration illustrated as an example in FIG. 22. For example, the server apparatus 10 includes a processor 311, a memory 312, an input-output interface 313, a communication interface 314, and so on. The components such as the processor 311 are connected to an internal bus, and so on so that these components can communicate with each other.

The hardware configuration of the server apparatus 10 is not limited to the configuration illustrated in FIG. 22. The server apparatus 10 may include hardware not illustrated or may be configured without the input-output interface 313 if desired. In addition, the number of components, such as the number of processors 311, included in the server apparatus 10 is not limited to the example illustrated in FIG. 22. For example, a plurality of processors 311 may be included in the server apparatus 10.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), and so on. The memory 312 stores an OS program, an application program, and various kinds of data.

The input-output interface 313 is an interface for a display apparatus and an input apparatus not illustrated. For example, the display apparatus is a liquid crystal display and so on. For example, the input apparatus is an apparatus that receives user operations, and examples of the input apparatus include a keyboard and a mouse.

The communication interface 314 is a circuit, a module, and so on for performing communication with other apparatuses. For example, the communication interface 314 includes a NIC (Network Interface Card) and so on.

The functions of the server apparatus 10 are realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the signage 20, the authentication terminal 30, the terminal 40, and the store server 50 can each be configured by an information processing apparatus, and the basic hardware configuration of the authentication terminal 30, the terminal 40, and the store server 50 is the same as that of the server apparatus 10. Thus, description of the basic hardware configuration of the authentication terminal 30, the terminal 40, and the store server 50 will be omitted. For example, the authentication terminal 30 may include a camera device for photographing a person to be authenticated.

The server apparatus 10, which is an information processing apparatus, includes a computer and can realize its functions by causing the computer to execute a program. In addition, the server apparatus 10 executes an authentication server control method by using this program.

[Variations]

The configurations, operations, and so on of the authentication systems according to the above example embodiments are examples and do not limit the present system configuration, and so on.

In the above example embodiments, it is described that the terminal 40 notifies the signage 20, and so on, of the membership ID in response to the request from the signage 20, and so on. However, the information that terminal 40 notifies the signage 20, and so on, via a short-range wireless communication is not limited to the membership ID. For example, the terminal 40 may notify the store terminal (the signage 20, the authentication terminal 30) of biometric information (for example, a face image) in addition to the membership ID. In this case, for example, the authentication terminal 30 stores the membership ID and the biometric information in association with each other. The authentication terminal 30 performs biometric authentication using the biometric information acquired from terminal 40 and biometric information of a person to be authenticated in front of the authentication terminal 30, and identifies the corresponding membership ID. The authentication terminal 30 may transmit the identified membership ID to the server apparatus 10 and request payment processing.

Figure 23:
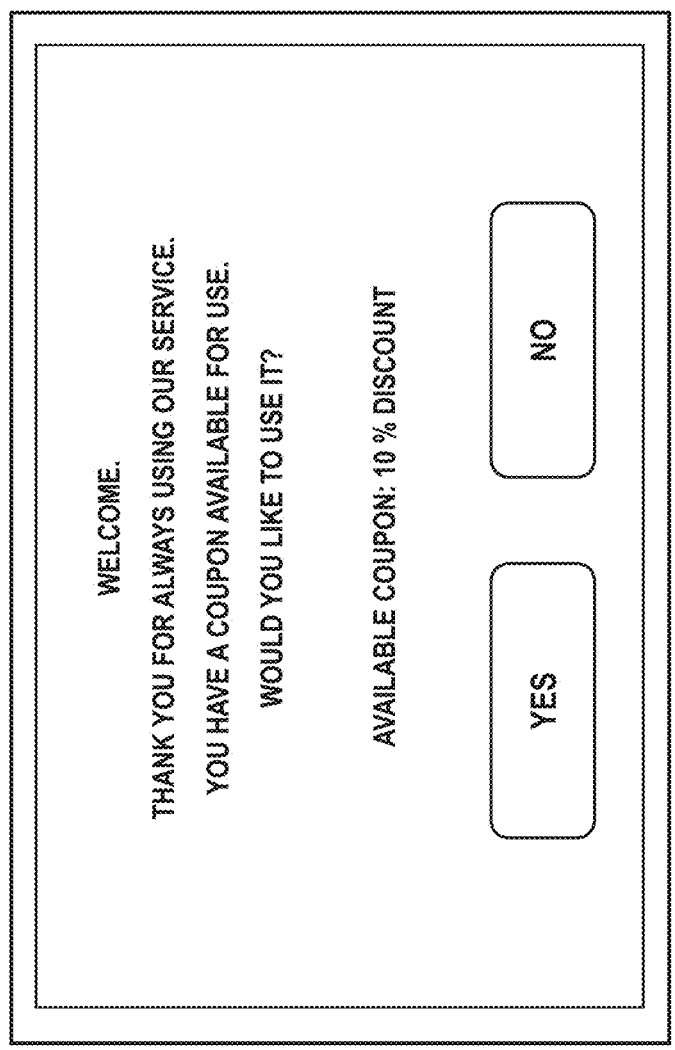
FIG. 23 is a diagram illustrating an operation of an authentication terminal of a variation according to the present application.
Figure 24:
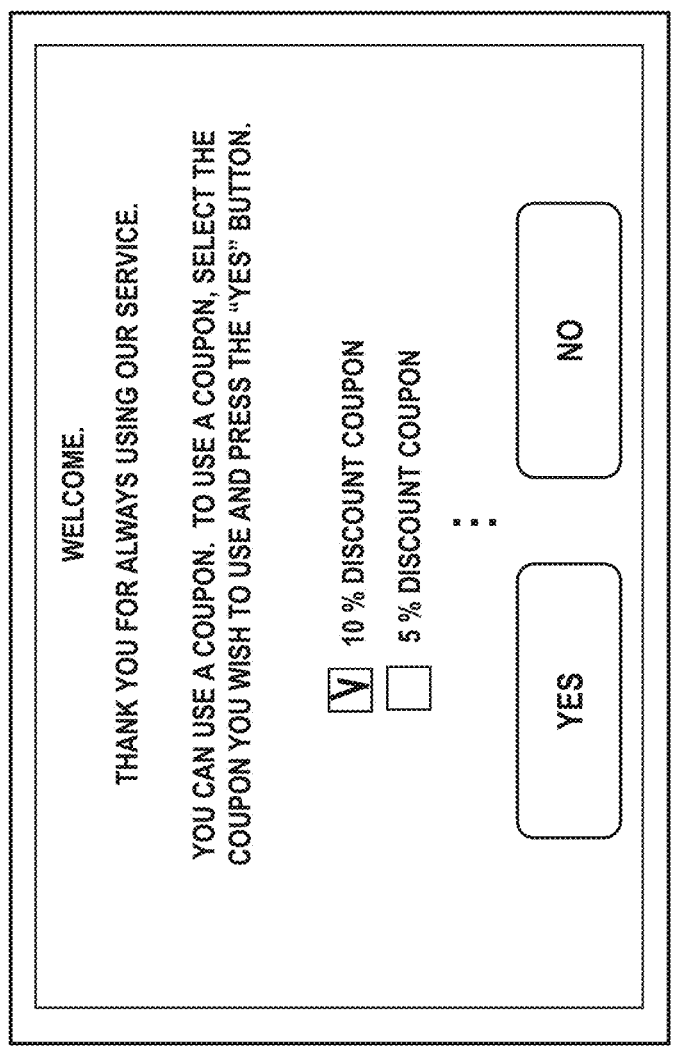
FIG. 24 is a diagram illustrating an operation of the authentication terminal of the variation according to the present application.

In addition to a membership ID, biometric information, personal information, account information, and so on, the server apparatus 10 may store information about coupons (for example, discounts on product prices) and special offers (for example, points that can be used during a birthday month) issued to each user (hereinafter referred to as special offer information). When the server apparatus 10 identifies a user by biometric authentication, the server apparatus 10 may automatically apply the special offer information of the identified user and perform payment processing. Alternatively, the server apparatus 10 may notify the authentication terminal 30 of the special offer information of the user identified by the biometric authentication. The authentication terminal 30 may inquire of an authentication successful person (a person to be authenticated who has been determined to be successfully authenticated) whether or not the special offer information notified by the server apparatus 10 needs to be applied (see FIG. 23). Alternatively, when a user has a plurality of special offer information (multiple types of special offer information), the authentication terminal 30 may ask the authentication successful person which special offer information he or she would like to select and apply (see FIG. 24). The authentication terminal 30 may apply a coupon, and so on, when the user indicates an intention to use the coupon or special offer. In this way, the authentication system of the present application may provide personalized services for utilizing coupons and special offers.

Alternatively, the special offer information regarding a coupon or a special offer may not be stored in the server apparatus 10, but the special offer information may be stored in the terminal 40 of the user. The terminal 40 may transmit the special offer information along with a membership ID to the signage 20 or the authentication terminal 30. When the user identified by biometric authentication holds a coupon or special offer, the authentication terminal 30 may automatically apply the coupon, and so on, or the authentication terminal 30 may perform processing according to the intention of the user (use of the coupon or non-use of the coupon). In this way, the authentication system of the present application can prevent users from forgetting to use coupons and special offers, and encourages continued repeat use of the store by making users perceive the convenience of the system.

The entrant list management unit 402 of the authentication terminal 30 and the entrant list management unit 602 of the store server 50 may delete an entry that has been registered in the entrant list for a predetermined period. Specifically, the entrant list management unit 402 may keep the size of the entrant list appropriate by deleting an entry (membership ID, biometric information) of a user who can be determined to have been in a store long enough to select a product, and so on. Alternatively, the entrant list management unit 402 may delete an entry (membership ID, biometric information) for a user who has been successfully authenticated by biometric authentication. When an entry is deleted in response to a successful biometric authentication, the entrant list management unit 402 may transmit an "entry deletion notification" that includes the deleted entry (membership ID) to the other authentication terminal 30. When the authentication terminal 30 receives the notification, the authentication terminal 30 deletes the above deleted entry from the entrant list managed by its own device.

Figure 25:
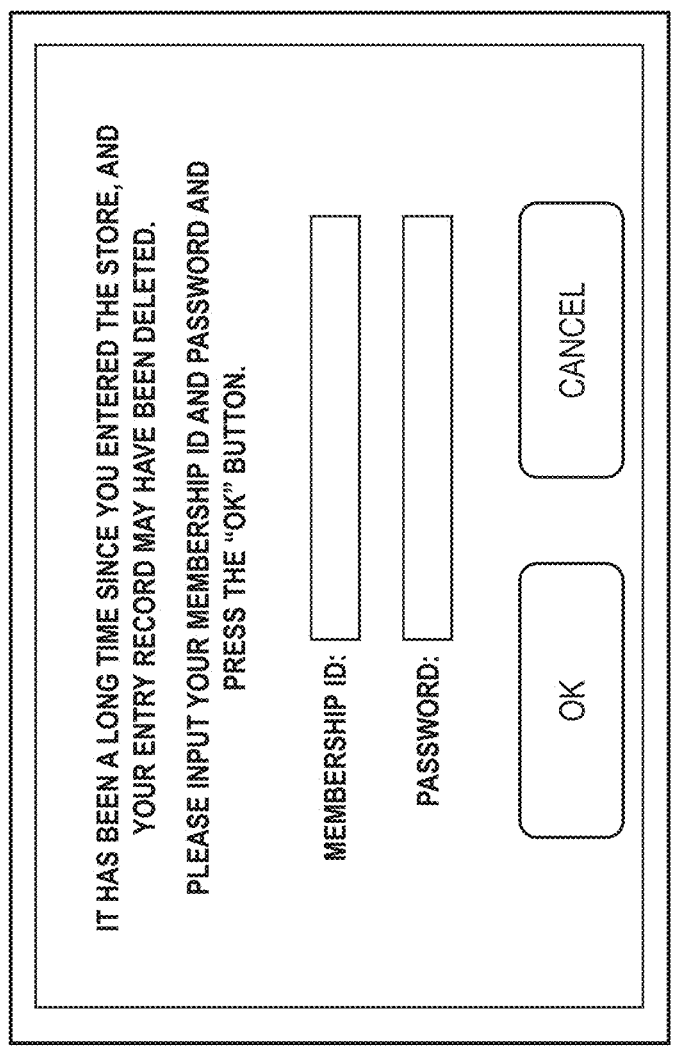
FIG. 25 is a diagram illustrating an operation of the authentication terminal of the variation according to the present application.

The authentication terminal 30 may take into consideration of a user whose entry has been removed from the entrant list after a predetermined period of time has elapsed since entering the store. For example, when the biometric authentication result is an authentication failure, the authentication terminal 30 may display a GUI (Graphical User Interface) which include the following message: "It has been a long time since you entered the store, and your entry record may have been deleted. Please input your membership ID and password." (See FIG. 25). In this way, the authentication terminal 30 may require the user to input his or her membership ID, password (passcode), and so on when the user whose entry has been deleted after a certain period has elapsed since entering the store makes payment for a product (when the user is subjected to biometric authentication). Note that when personal authentication is performed by a password, the membership information database of the server apparatus 10 stores the membership ID and the password in association with each other.

Figure 26:
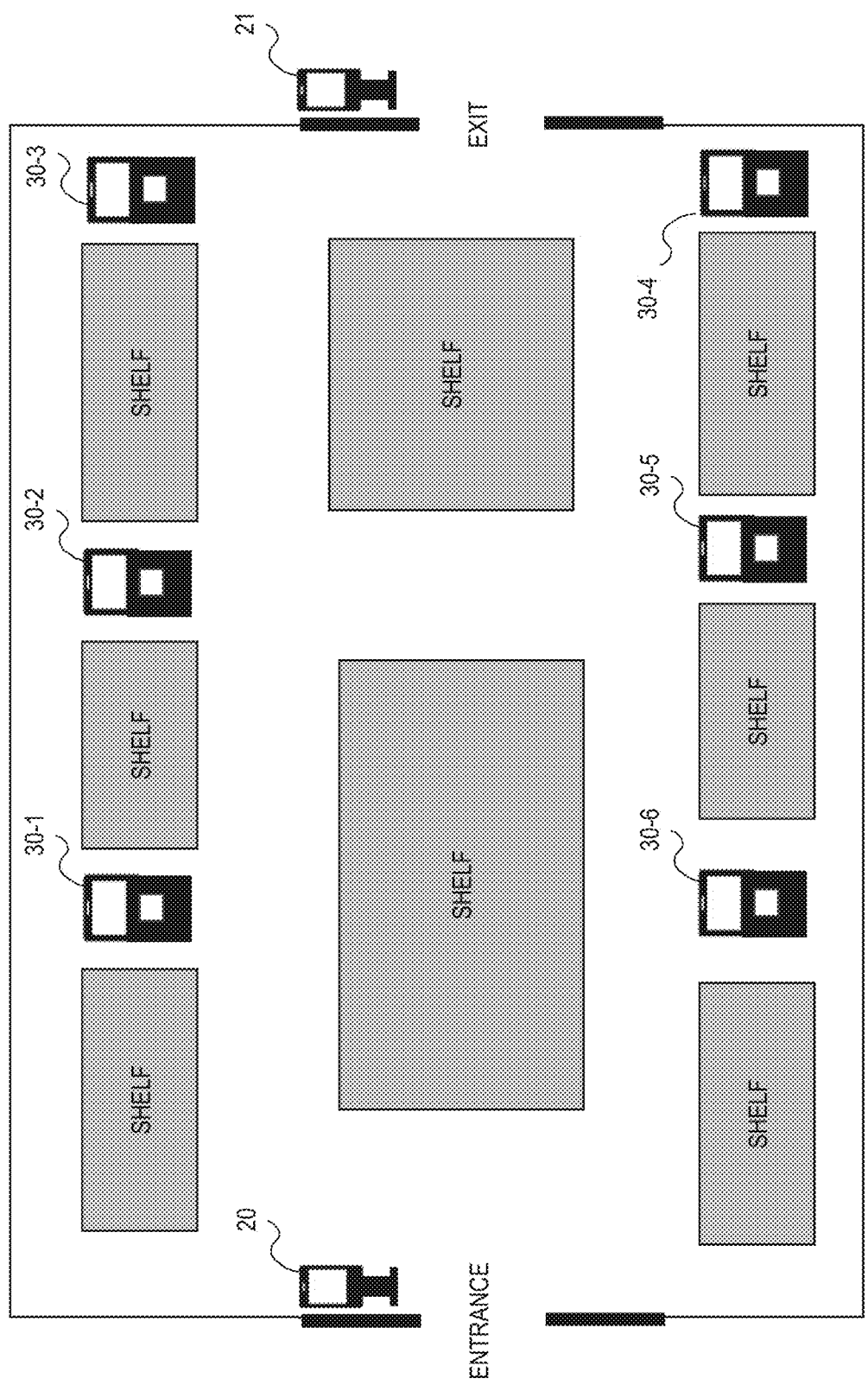
FIG. 26 is a diagram illustrating an arrangement of signages of a variation according to the present application.

Alternatively, when an entrance and an exit of a store are different, a membership ID of a user detected at the exit may be removed from the entrant list. In this case, as shown in FIG. 26, a signage 21 is installed at the exit of the store. When the member detection unit 302 of the signage 21 acquires a membership ID from the terminal 40 of the user via a short-range wireless communication, the member detection unit 302 determines that the user has left the store. The member detection unit 302 transmits a "member exit notification" that includes the acquired membership ID to the authentication terminal 30. The authentication terminal 30 that has received the member exit notification deletes the entry in the entrant list corresponding to the membership ID described in the notification.

For example, when the signage 21 is installed as shown in FIG. 26, the store server 50 can accurately grasp a situation in the store. More specifically, in a configuration shown in FIG. 26, the signage 20 installed at the entrance transmits a member entry notification to the store server 50. On the other hand, the signage 21 installed at the exit transmits a member exit notification to the store server 50. The entrant list management unit 602 of the store server 50 can accurately identify users who are staying at the store through the two notifications.

Furthermore, the store server 50 can also determine whether a user has performed consumption behavior in a store or not by using an authentication request by the authentication terminal 30. Specifically, the store server 50 can determine that a user who is the target person for an authentication request has engaged in consumption behavior, and that a user who is not the target person for an authentication request and has left the store (a user whose membership ID is included in a member exit notification) has not engaged in consumption behavior. Alternatively, the store server 50 may also identify a user whose membership ID has been deleted because a predetermined time has elapsed as a user who has not engaged in consumption behavior.

Figure 27:
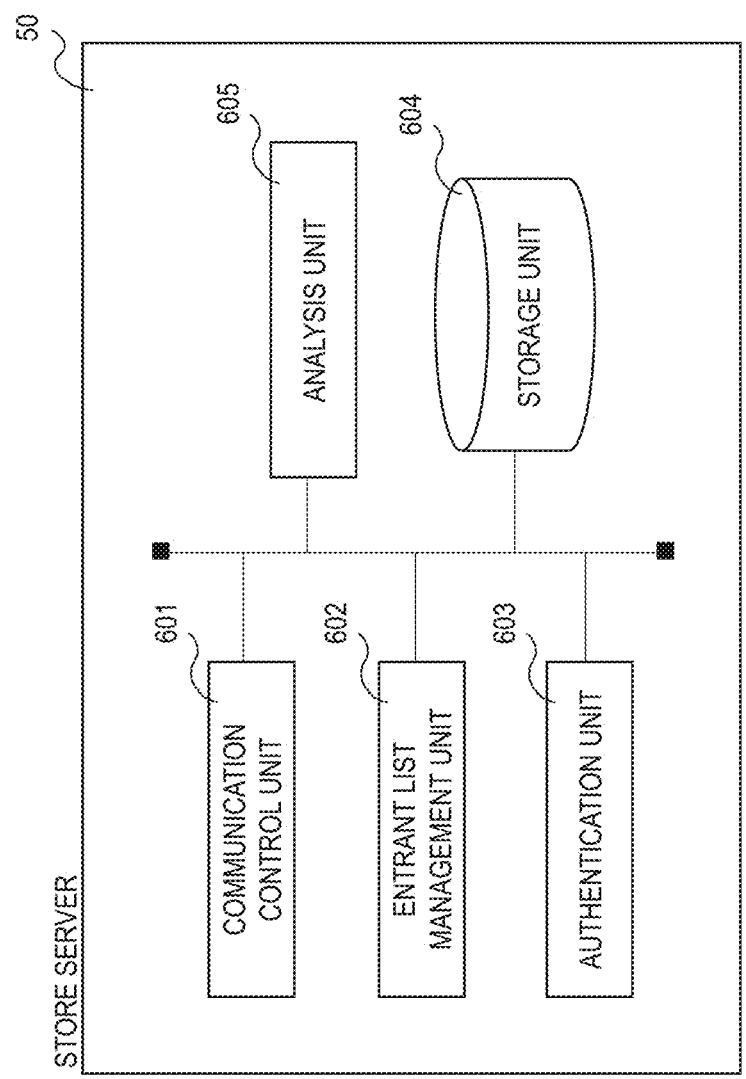
FIG. 27 is a diagram illustrating an example of a schematic configuration of a store server of a variation according to the present application.

The store server 50 may calculate an opportunity loss rate using the above determined types of users (the user who has engaged in consumption behavior and the user who has not engaged in consumption behavior). In this case, the store server 50 includes an analysis unit 605, as shown in FIG. 27. The analysis unit 605 is means for calculating various indices, and so on, by analyzing an entrant list or an authentication request (or a result of an authentication process) from the authentication terminal 30. For example, the analysis unit 605 may calculate a ratio of the number of users who did not engage in consumption behavior to the total number of people who entered the store in a day. Specifically, the analysis unit 605 calculates the ratio of the number of users who have not engaged in consumption behavior to the number of visitors to the store (the number of people who entered the store) as an "opportunity loss rate". The analysis unit 605 of the store server 50 calculates a ratio of users whose biometric authentication did not result in a successful authentication among the users who entered the store as the opportunity loss rate. In this way, the store server 50 calculates the number of persons staying whose biometric authentication results were not successful with respect to the number of persons staying in a predetermined area during a predetermined period as the opportunity loss rate. For example, if the number of users who visited the store in a day (total number of persons staying) is 100, and the number of users who did not succeed in biometric authentication (number of persons who did not engage in consumption behavior) is 30, the opportunity loss rate is calculated to be 30%. The analysis unit 605 presents the calculated opportunity loss rate to a store operator, or the like. For example, the analysis unit 605 presents the opportunity loss rate per day to the store operator, or the like, as shown in FIG. 28.

In addition, the store server 50 may calculate an opportunity loss rate for each of the attributes of the user (for example, gender and age). In this case, the analysis unit 605 transmits a membership ID of a user who has entered the store to the server apparatus 10 and acquires the personal information (gender, age, and so on) of the user corresponding to the membership ID. The analysis unit 605 can calculate an opportunity loss rate for each age group and gender by associating and managing the acquired personal information (attribute information; gender, age) with a membership ID. In this way, the store server 50 may calculate the opportunity loss rate for each attribute information that can be derived from the membership ID of the user (see FIG. 29). Note that FIG. 29 shows opportunity loss rates by age group. Note that various attributes of users can be considered when calculating the opportunity loss rate, in addition to the gender and the age described above. For example, the store server 50 may calculate opportunity loss rates for each member grade and each amount of product purchased within a predetermined period (for example, one week or one month).

Note that the calculation of the opportunity loss rate and the calculation of the opportunity loss rate for each attribute may be performed by the server apparatus 10. In this way, the authentication system of the present application may calculate a store usage rate of the user (opportunity loss rate) and provide information useful for a service business operator.

The server apparatus 10 and the store server 50 can calculate a flow line of a user by managing a track record (history) of the authentication terminal 30 that successfully communicated with the terminal 40 of the user by a short-range wireless communication. To calculate the flow line of a user, each of the 30 authentication terminals needs to be compatible with short-range wireless communication. When the authentication terminal 30 detects a user by the short-range wireless communication, the authentication terminal 30 transmits the membership ID acquired from the terminal 40 of the user to the store server 50.

The entrant list management unit 602 of the store server 50 manages the authentication terminal 30 that is a sender of the membership ID in chronological order. For example, the store server 50 maintains the entrant list as shown in FIG. 30. The entrant list management unit 602 adds a terminal ID of the authentication terminal 30 that is a sender of the membership ID to a flow line field. Note that in FIG. 30, for ease of understanding, the reference sign of the authentication terminal 30 is described as a terminal ID. Referring to FIG. 30, since the membership ID of the second described user on the entrant list is acquired at the authentication terminals 30-1, 30-2, 30-5, and 30-6, in that order, it can be seen that the user does not go to the back of the store layout shown in FIG. 3, but instead goes through the middle aisle to the entrance and exit. In this way, by placing a plurality of authentication terminals 30 (edge devices) that support the short-range wireless communication in the store, it is possible to identify a route (golden route) and a display shelf that contribute the most to purchasing, or to identify a location where users are unlikely to stop by. By analyzing such results, the service business operator that operates the store can review the layout of the store.

Figure 31:
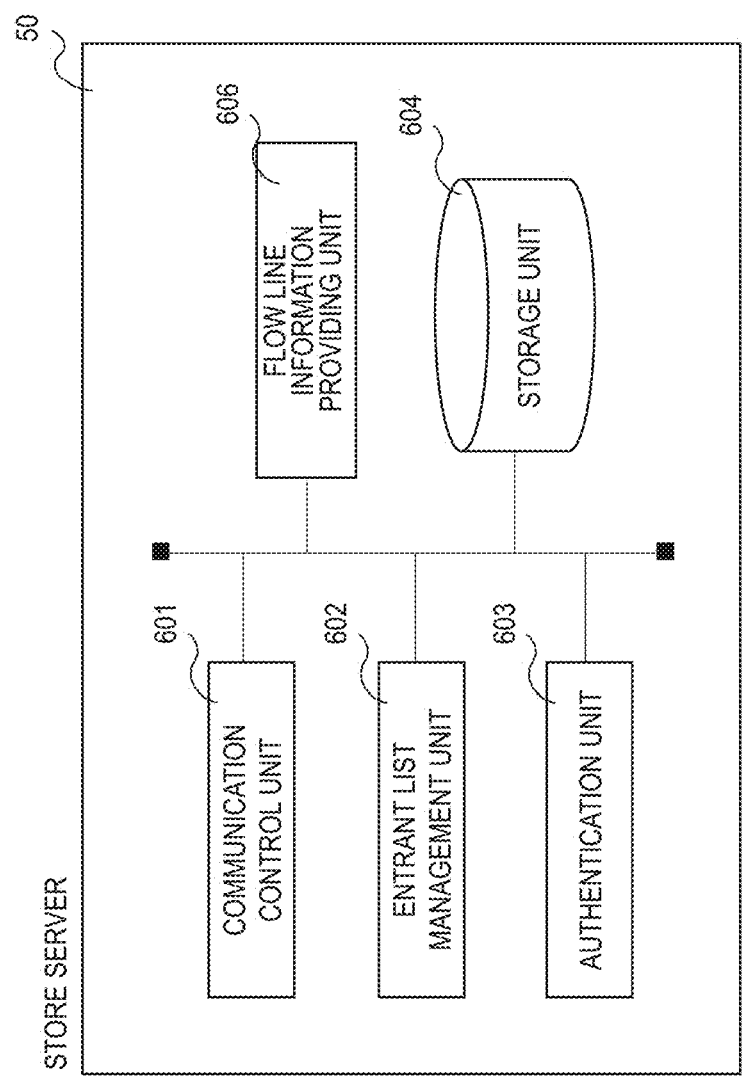
FIG. 31 is a diagram illustrating an example of a schematic configuration of a store server of a variation according to the present application.

Note that when providing information about a flow line to the service business operator, the store server 50 includes a flow line information providing unit 606, as shown in FIG. 31. The flow line information providing unit 606 reads out a flow line from a flow line field of the entrant list and provides the flow line in response to a request from a manager or the like of the service business operator. More specifically, the flow line information providing unit 606 tabulates the number of each route (flow line) and presents the results. In the example in FIG. 30, the results are presented as follows: "2" for the number of clockwise flow lines through the center corridor (the second and third two entries correspond), "1" for the number of flow lines through the upper corridor to the back (the first entry), and "1" for the number of flow lines through the lower corridor to the back (the fourth entry).

The server apparatus 10 and the store server 50 may use attribute information (personal information) of a user when providing flow line information. For example, the flow line information providing unit 606 may calculate flow lines for each gender and age. In this case, the store server 50 acquires the personal information (attribute information; age, gender, and so on) of the person entering a store from the server apparatus 10. The flow line information providing unit 606 may utilize the acquired personal information and provide information on flow lines by gender and by age (number of flow lines) to the manager or the like. For example, the flow line information providing unit 606 presents information on flow lines for each attribute to the store operator, or the like, as shown in FIG. 32. Note that a flow line ID shown in FIG. 32 is an ID that identifies a flow line that the user can take. For example, an ID such as "flow line 1" is assigned to a flow line that passes through a reception terminal 30-1, a reception terminal 30-2, and a reception terminal 30-3.

Alternatively, the flow line information providing unit 606 may calculate an opportunity loss rate for each flow line. The flow line information providing unit 606 calculates the number of persons entering a store for each flow line, and also calculates the number of persons who have not been successfully authenticated for each flow line. The flow line information providing unit 606 calculates the opportunity loss rate by calculating a ratio of the number of persons who are not successfully authenticated to the number of persons who enter the store. In this case, for example, the flow line information providing unit 606 presents information regarding the opportunity loss rate for each flow line to a store operator, or the like, as shown in FIG. 33.

For example, the flow line information providing unit 606 can provide information such as that women in their 20s to 30s often move along "flow line 1", but that their opportunity loss rate is as high as "50%", to the store operator, or the like. Furthermore, the flow line information providing unit 606 can propose that the opportunity loss rate may be reduced by changing products for women in their 20s to 30s that are placed in flow line 1. Alternatively, the flow line information providing unit 606 can present information that there are few men in their 50s who move along "flow line 3", but that the opportunity loss rate is as low as "5%" to the store operator, or the like. Therefore, for example, the flow line information providing unit 606 suggests that it would be better to maintain products for men in their 50s in flow line 3, while replacing products for other generations.

In this way, the authentication system of the present application may provide a flow line analysis service. In other words, each of a plurality of the authentication terminals 30 installed in a store acquires a membership ID from the terminal 40 possessed by a user (a person staying in the store), and then notifies the store server 50 of the membership ID. The store server 50 calculates a flow line of the person staying based on the notified membership ID and a terminal ID of the authentication terminal 30 that is a sender of the membership ID. At that time, the store server 50 may calculate flow line information for each attribute of the user.

The server apparatus 10 and the store server 50 may analyze attribute information and purchase information of a user. For example, the server apparatus 10 may calculate the best-selling products by each gender and age, and so on, as a result of the analysis.

In this way, in the variations of the present application, useful information can be provided to the store operator, or the like, by analyzing the membership ID that has been deleted without successful authentication over a long period of time, the attribute, the flow line (movement route), the time of entry into the store, the presence or absence of member information, and so on.

In the above example embodiments, it is described that a membership ID is transmitted and received between each device. However, instead of the membership ID, a terminal number may be transmitted and received between each apparatus (the signage 20, the terminal 40, the authentication terminal 30, and the server apparatus 10). In other words, the server apparatus 10 may treat the terminal number as the membership ID. In this case, the server apparatus 10 may store the terminal number, biometric information, account information, and so on, in association with each other.

Figure 34:
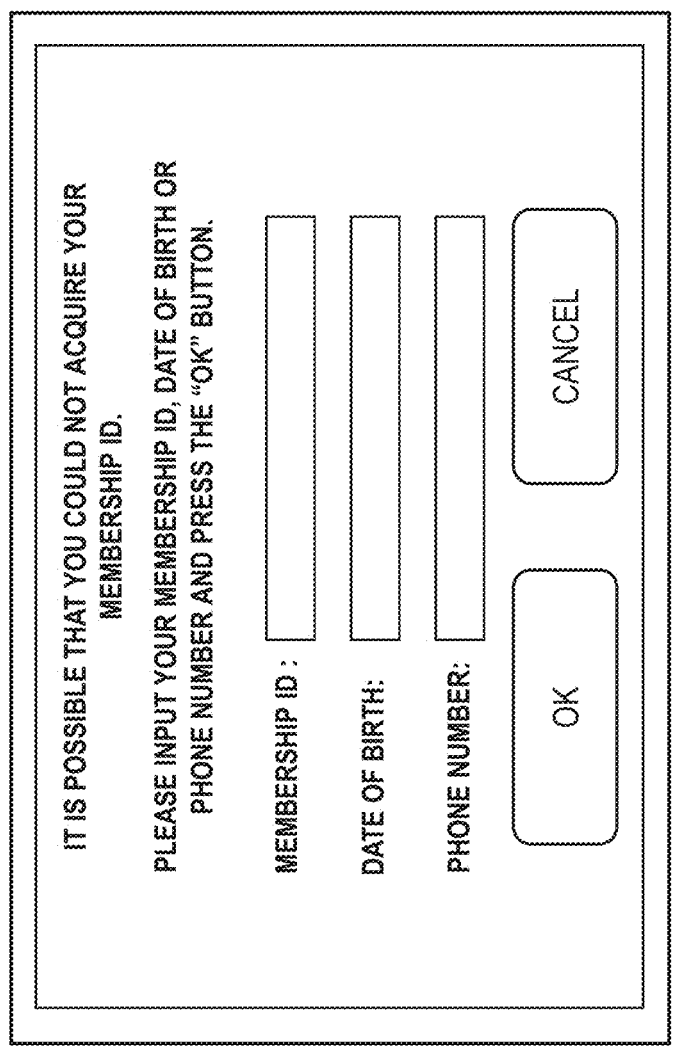
FIG. 34 is a diagram illustrating an operation of an authentication terminal of a variation of the present application.

Actions may be taken to consider a user who enters the store without the terminal 40 or a user who has the terminal 40 that does not support a short-range wireless communication (the terminal 40 that does not have the short-range wireless communication functionality enabled). For example, when the authentication terminal 30 fails in biometric authentication, the authentication terminal 30 may display a GUI such as "It is possible that you could not acquire your membership ID. Please input your membership ID and date of birth or phone number." or a similar GUI (see FIG. 34). In other words, when it is not possible to narrow down authentication targets (narrow down entries in the database) by the membership ID, a password authentication may be performed instead of a biometric authentication. Alternatively, a user who does not have the terminal 40 of the user may report that fact to a clerk (report that he or she has forgotten the terminal), and based on an instruction from the clerk, input his or her membership ID and password (information similar to a password, such as date of birth, phone number, and so on) into the server apparatus 10.

Alternatively, the signage 20 may detect surrounding users using a human detection sensor and so on. When the signage 20 is unable to receive a response to a membership ID transmission request despite being able to detect a user by using a human detection sensor, the signage 20 may prompt the user to enable a short-range wireless communication function of the terminal 40 of the user. In other words, when the user approaches a predetermined area (inside a store) but the short-range wireless communication function (for example, Bluetooth (registered trademark)) is turned off, a message may be output to prompt the user to enable the short-range wireless communication function of the terminal 40 of the user. Alternatively, the signage 20 may display a message on its own device prompting the user to enable the above short-range wireless communication.

In the above example embodiments, a video rental store is described as an example of a service business operator. However, it is of course possible to apply the authentication system of the present application to other types of industries as well. For example, the present application may be applied to the lodging industry. In this case, a hotel or hotel premises are set as the "predetermined area", and the authentication terminal 30 corresponds to a check-in terminal installed at a check-in counter or the like. Alternatively, a station or an airport may be set as a "predetermined area". In this case, a ticket checker or a gate apparatus corresponds to the authentication terminal 30. For example, the signage 20 may be installed near an entrance and exit of the station, and the signage 20 may acquire an ID from the terminal 40 of a passenger. Alternatively, an event venue such as a stadium (baseball stadium, soccer field) or a building and so on may be set as the "predetermined area". The signage 20 or a tablet that includes a function equivalent to that of the signage 20 may be installed near an entrance and exit of the stadium or the building, and the signage 20, or the like, may acquire a membership ID of a visitor or an ID of an employee (employee number, and so on) from the terminal 40. A list equivalent to the above entrant list (a list of spectators near the event venue, a list of employees who are about to go to work) may be generated by using the ID acquired by the signage 20, and so on.

In the second example embodiment, a case in which biometric authentication is performed on the edge (on the store side) is described. In other words, a case is described in which the server apparatus 10 does not perform a biometric authentication. However, the server apparatus 10 may perform the biometric authentication even in the second example embodiment. For example, the server apparatus 10 according to the second example embodiment may decide whether or not to perform biometric authentication according to the service business operator. For example, in FIG. 2, the server apparatus 10 may perform biometric authentication when the server apparatus 10 receives an authentication request from service business operator A and may notify service business operator B of corresponding biometric information when the server apparatus 10 receives a member entry notification from service business operator B.

In the above example embodiments, it is described that the signage 20 is installed near the entrance and exit of a store. However, the signage 20 may be installed elsewhere in the store (for example, in the center of the store). The signage 20 may be installed near a place where a person staying in the store passes through. In addition, the number of the signage 20 installed in a store is not limited to "1", and a plurality of the signage 20 may be installed in a store.

In the above example embodiments, it is described that the signage 20 notifies the authentication terminal 30 of a membership ID. However, the signage 20 may generate an entrant list and distribute the list to the authentication terminal 30. In other words, the signage 20 may update the entrant list every time a user enters a store, and transmit the updated entrant list to the authentication terminal 30.

In the above example embodiments, it is described that the signage 20 detects the entry of a member into a store. However, detection of the member may be performed by other devices. For example, a surveillance camera installed near an entrance or exit may be provided with a communication function (a communication function using a short-range wireless communication), and the surveillance camera may notify the authentication terminal 30 of a membership ID.

In the above example embodiments, it is described a case in which the terminal 40 and the signage 20 transmit and receive a membership ID by a short-range wireless communication such as Bluetooth (registered trademark). However, the membership ID may be transmitted and received by other means. For example, the membership ID may be transmitted and received using RFID (Radio Frequency Identification) technology, such as that used in transportation IC (Integrated Circuit) cards. Alternatively, the user may have the signage 20 read a two-dimensional code or the like in which the membership ID is encoded, and the membership ID may be transmitted to a store.

In the above example embodiments, it is described a case in which the terminal 40 transmits a membership ID to the signage 20 in response to a membership ID transmission request. However, the terminal 40 may transmit a terminal ID to the signage 20 periodically or at a predetermined timing by using a short-range wireless communication. Specifically, a user may start an application installed on the terminal 40 (an application for transmitting the terminal ID and performing facial payment), set the terminal ID to be transmitted periodically, and enter a store. In this way, the signage 20 can acquire the terminal ID through the short-range wireless communication without transmitting a membership ID transmission request.

While the above example embodiments have been described based on a case in which the membership information database is established in the server apparatus 10, the membership information database may be established in an externally installed database server. That is, some functions of the server apparatus 10 may be implemented in another server. More specifically, the "member detection unit (member detection means)", "entrant list management unit (entrant list management means)", "authentication unit (authentication means)" and so on described above may be implemented in any of the apparatuses included in the system.

The server apparatus 10 may verify identity of a user at the time of user registration. Specifically, the server apparatus 10 acquires an identity verification document (for example, passport, driver's license, and so on) in which biometric information of the user is described, along with his or her biometric information, personal information, and so on. The server apparatus 10 performs a one-to-one matching using the biometric information from the identity verification document and the biometric information acquired from the user. The server apparatus 10 may perform user registration when the matching is successful.

In the above example embodiments, it is described a case in which a feature value generated from a face image is stored in the membership information database, but the feature value may not be stored in the database. Instead of the feature values, the face image may be registered in the membership information database, and the server apparatus 10 may generate a feature value from the registered face image each time the server apparatus 10 processes an authentication request.

While the data exchange between the server apparatus 10, the signage 20, the authentication terminal 30, and the store server 50 is not limited to any particular mode, data exchanged between these apparatuses may be encrypted. It is desirable that the biometric information and so on are transmitted and received between these apparatuses and encrypted data is transmitted and received in order to properly protect this information.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to authentication systems that authenticate users registered as members, and so on.

A part or the entirety of the example embodiments described above may be described as in the following supplementary notes, but is not limited to the followings.

Supplementary Note 1

A system, including:
a server apparatus that stores an ID of each of a plurality of users and biometric information in association with each other; and
at least one or more authentication terminals,
wherein the at least one or more authentication terminals maintain an ID list that stores IDs of at least one or more persons staying in a predetermined area and transmit an authentication request, the authentication request including biometric information of a person to be authenticated and the ID list, to the server apparatus when an authentication of the person to be authenticated is required, and
the server apparatus extracts IDs included in the ID list from the ID of each of the plurality of users and performs biometric authentication using biometric information corresponding to the extracted IDs and the biometric information included in the authentication request.

Supplementary Note 2

The system according to supplementary note 1, wherein the server apparatus notifies an ID of an authentication successful person to the authentication terminal that is a sender of the authentication request when the biometric authentication is successful, and
  wherein the authentication terminal provides a service to the authentication successful person by using the ID of the authentication successful person.

Supplementary Note 3

The system according to supplementary note 1 or 2, further including a device that acquires the IDs of the at least one or more persons staying from terminals possessed by the at least one or more persons staying,
  wherein the device notifies the acquired IDs of the at least one or more authentication terminals, and
  wherein the authentication terminals store the notified IDs in the ID list.

Supplementary Note 4

The system according to supplementary note 3, wherein the device acquires the IDs of the at least one or more persons staying by communicating via a short-range wireless communication with the terminals.

Supplementary Note 5

The system according to supplementary note 3 or 4, wherein the device notifies the IDs of the at least one or more persons staying of each of a plurality of authentication terminals installed in the predetermined area.

Supplementary Note 6

The system according to supplementary note 1 or 2, wherein the at least one or more authentication terminals acquires the IDs of the at least one or more persons staying by communicating via a short-range wireless communication with the terminals.

Supplementary Note 7

The system according to supplementary note 2, wherein the server apparatus stores the ID of each of the plurality of users, biometric information and special offer information in association with each other and notifies the ID of the authentication successful person and the offer information to the authentication terminal that is the sender of the authentication request when the biometric authentication is successful, and
  wherein the authentication terminal inquires the authentication successful person whether or not the notified special offer information needs to be applied.

Supplementary Note 8

A system, including:
  a first server apparatus that stores an ID of each of a plurality of users and biometric information in association with each other;
  a device that notifies an ID of a person staying in a predetermined area to the first server apparatus, and
  at least one or more authentication terminals,
  wherein the first server apparatus notifies biometric information corresponding to the notified ID among the IDs of the plurality of users to the at least one or more authentication terminals, and
  wherein the at least one or more authentication terminals stores the notified biometric information in a biometric information list and performs biometric authentication using the biometric information of a person to be authenticated and biometric information stored in the biometric information list when an authentication of the person to be authenticated becomes necessary.

Supplementary Note 9

The system according to supplementary note 8, wherein the first server apparatus notifies the notified ID from the device along with the biometric information corresponding to the notified ID to the at least one or more authentication terminals, and
  wherein the at least one or more authentication terminals stores the notified ID and biometric information in the biometric information list.

Supplementary Note 10

The system according to supplementary note 8 or 9, further including a second server apparatus that receives the biometric information from the first server apparatus instead of the at least one or more authentication terminals,
  wherein the at least one or more authentication terminals transmits an authentication request, the authentication request including the biometric information of the person to be authenticated, to the second server apparatus, and
  wherein the second server apparatus performs biometric authentication using the biometric information received from the first server apparatus and the biometric information included in the authentication request.

Supplementary Note 11

The system according to supplementary note 10, wherein the second server apparatus calculates a number of persons staying whose biometric authentication results were not successful with respect to a number of persons staying in a predetermined area during a predetermined period as an opportunity loss rate.

Supplementary Note 12

The system according to supplementary note 10, wherein the authentication terminal notifies the acquired ID of the second server apparatus when the authentication terminal acquires the ID of the person staying, and wherein the second server apparatus calculate a flow line of the person staying by a terminal ID of a sender of the notified ID.

Supplementary Note 13

A server apparatus including:
a storage unit that stores an ID of each of a plurality of users and biometric information in association with each other;
a receiving unit that receives an authentication request, the authentication request including biometric information of a person to be authenticated and an ID list, from an authentication terminal that maintains the ID list that stores IDs of at least one or more persons staying in a predetermined area; and
an authentication unit that extracts IDs included in the ID list from the ID of each of the plurality of users and performs biometric authentication using biometric information corresponding to the extracted IDs and the biometric information included in the authentication request.

Supplementary Note 14

An authentication method performed in a server apparatus that stores an ID of each of a plurality of users and biometric information in association with each other, the authentication method including:
receiving an authentication request, the authentication request including biometric information of a person to be authenticated and an ID list, from an authentication terminal that maintains the ID list that stores IDs of at least one or more persons staying in a predetermined area;
extracting IDs included in the ID list from the ID of each of the plurality of users; and
performing biometric authentication using biometric information corresponding to the extracted IDs and the biometric information included in the authentication request.

Supplementary Note 15

A computer-readable storage medium storing a program that causes a computer mounted on a server apparatus that stores an ID of each of a plurality of users and biometric information in association with each other, to perform processing for:
receiving an authentication request, the authentication request including biometric information of a person to be authenticated and an ID list, from an authentication terminal that maintains the ID list that stores IDs of at least one or more persons staying in a predetermined area;
extracting IDs included in the ID list from the ID of each of the plurality of users; and
performing biometric authentication using biometric information corresponding to the extracted IDs and the biometric information included in the authentication request.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10 server apparatus
20 signage
21 signage
30 authentication terminal
30-1 authentication terminal
30-2 authentication terminal
30-3 authentication terminal
30-4 authentication terminal
30-5 authentication terminal
30-6 authentication terminal
40 terminal
50 store server
101 server apparatus
102 authentication terminal
201 communication control unit
202 user registration unit
203 authentication unit
204 payment unit
205 storage unit
206 biometric information notification unit
301 communication control unit
302 member detection unit
303 message output unit
304 storage unit
311 processor
312 memory
313 input-output interface
314 communication interface
401 communication control unit
402 entrant list management unit
403 biometric information acquisition unit
404 authentication request unit
405 payment request unit
406 storage unit
407 member detection unit
408 authentication unit
501 communication control unit
502 user registration request unit
503 membership ID transmitting unit
504 storage unit
601 communication control unit
602 entrant list management unit
603 authentication unit
604 storage unit
605 analysis unit
606 flow line information providing unit

What is claimed is:
1. A system, comprising:
a server apparatus that stores, in a database, an identifier (ID) of each of a plurality of users and biometric information in association with each other; and
first and second authentication terminals,
wherein the first and second authentication terminals maintain a respective ID list that stores IDs of one or more persons staying in a predetermined area,
wherein the first authentication terminal transmits an authentication request, the authentication request including biometric information of a person to be authenticated and the ID list, to the server apparatus when an authentication of the person to be authenticated is required, wherein the server apparatus extracts IDs in the ID list included in the authentication request from the database of IDs of each of the plurality of users, performs biometric authentication using biometric information corresponding to the extracted IDs and the biometric information included in the authentication request, and transmits an authentication result of the biometric authentication to the first authentication terminal, wherein the first authentication terminal deletes the ID of the person to be authenticated from its respective ID list based on the received authentication result from the server apparatus indicating that the biometric authentication is successful authentication, and notifies the second authentication terminal of the ID of the person to be authenticated, wherein the second authentication terminal deletes the notified ID from its respective ID list in response to receiving the notified ID, and wherein the person to be authenticated is notified of a failure of the authentication based on the received authentication result from the server apparatus indicating that the biometric authentication is unsuccessful authentication.

2. The system according to claim 1, wherein the server apparatus notifies an ID of an authentication successful person to the first authentication terminal that is a sender of the authentication request when the result of the biometric authentication is successful, and wherein the first authentication terminal provides a service to the authentication successful person by using the ID of the authentication successful person.

3. The system according to claim 1, further comprising a digital signage that acquires the IDs of the one or more persons staying in the predetermined area from mobile terminals possessed by the one or more persons staying in the predetermined area, wherein the digital signage notifies the acquired IDs of the one or more persons staying in the predetermined area to the first and second authentication terminals, and wherein the first and second authentication terminals store the notified IDs in their respective ID list.

4. The system according to claim 3, wherein the digital signage acquires the IDs of the one or more persons staying in the predetermined area by communicating via a short-range wireless communication with the mobile terminals.

5. The system according to claim 3, wherein the digital signage notifies the IDs of the one or more persons staying in the predetermined area to each of a plurality of authentication terminals installed in the predetermined area.

6. The system according to claim 3, wherein at least one of the first and second authentication terminals acquires the IDs of the one or more persons staying in the predetermined area by communicating via a short-range wireless communication with the mobile terminals.

7. The system according to claim 2, wherein the server apparatus stores the ID of each of the plurality of users, the biometric information and special offer information in association with each other and notifies the ID of the authentication successful person and the special offer information to the first authentication terminal that is the sender of the authentication request when the biometric authentication is successful, and wherein the first authentication terminal inquires the authentication successful person whether or not the notified special offer information needs to be applied.

* * * * *